United States Patent
Ando et al.

(10) Patent No.: US 7,856,145 B2
(45) Date of Patent: Dec. 21, 2010

(54) IMAGE PROCESSING SYSTEM AND METHOD THEREFOR, IMAGE PROCESSING APPARATUS AND METHOD, IMAGE CAPTURING APPARATUS AND METHOD, PROGRAM RECORDING MEDIUM, AND PROGRAM

(75) Inventors: Kazutaka Ando, Kanagawa (JP); Tetsujiro Kondo, Tokyo (JP); Yasunobu Node, Tokyo (JP); Michimasa Obana, Tokyo (JP); Kei Hiraizumi, Kanagawa (JP); Masanori Machimura, Tokyo (JP); Masato Akao, Kanagawa (JP)

(73) Assignee: Sony Corporation, Tokyo (JP)

( * ) Notice: Subject to any disclaimer, the term of this patent is extended or adjusted under 35 U.S.C. 154(b) by 980 days.

(21) Appl. No.: 11/675,309

(22) Filed: Feb. 15, 2007

(65) Prior Publication Data

US 2007/0201107 A1    Aug. 30, 2007

(30) Foreign Application Priority Data

Feb. 28, 2006    (JP) .......................... P2006-052644

(51) Int. Cl.
*G06K 9/46* (2006.01)
*G06K 9/66* (2006.01)
*H04N 5/76* (2006.01)

(52) U.S. Cl. ....................... 382/190; 382/291; 382/293; 382/295; 348/231.3; 348/231.6; 348/231.9

(58) Field of Classification Search ................ 382/103, 382/190, 276, 291, 293, 295, 298; 348/25, 348/169, 231.1, 231.6, 231.9, 511
See application file for complete search history.

(56) References Cited

U.S. PATENT DOCUMENTS

| | | | | |
|---|---|---|---|---|
| 5,204,749 | A * | 4/1993 | Toyama et al. | 348/352 |
| 6,404,455 | B1 * | 6/2002 | Ito et al. | 348/169 |
| 6,445,409 | B1 * | 9/2002 | Ito et al. | 348/155 |
| 7,170,633 | B2 * | 1/2007 | Hara et al. | 358/1.9 |
| 7,212,126 | B2 * | 5/2007 | Hachiga | 340/572.8 |
| 7,693,303 | B2 * | 4/2010 | Nobori et al. | 382/105 |
| 2005/0046706 | A1 * | 3/2005 | Sesek et al. | 348/231.3 |
| 2007/0070201 | A1 * | 3/2007 | Yokomitsu et al. | 348/169 |
| 2009/0262984 | A1 * | 10/2009 | Hildreth et al. | 382/103 |

FOREIGN PATENT DOCUMENTS

JP    2003-202944    7/2003

* cited by examiner

*Primary Examiner*—John B Strege
(74) *Attorney, Agent, or Firm*—Oblon, Spivak, McClelland, Maier & Neustadt, L.L.P.

(57) ABSTRACT

An image processing system includes an image capturing apparatus, and an image processing apparatus. The image capturing apparatus is configured to capture an image including an object, to obtain status information of the object, and to record the image and the status information of the object. The image processing apparatus is configured to specify details of a modification to be applied to the image according to the recorded image and status information of the object, to set setting information for modifying the image on the basis of the details of the modification, to extract a feature value from the image, and to record the setting information in a setting-information recording medium in association with the extracted feature value of the image.

27 Claims, 30 Drawing Sheets

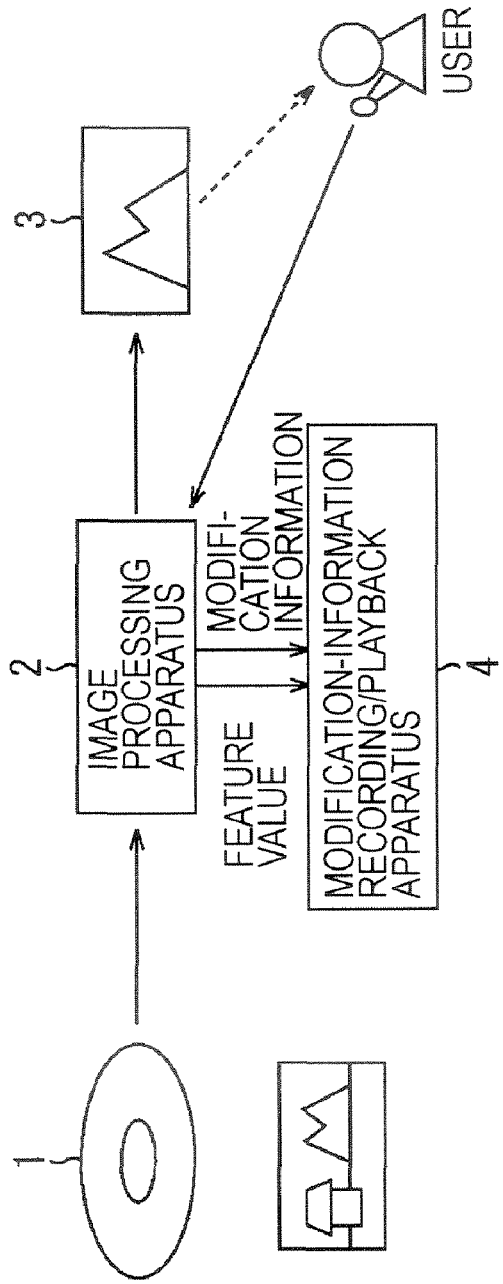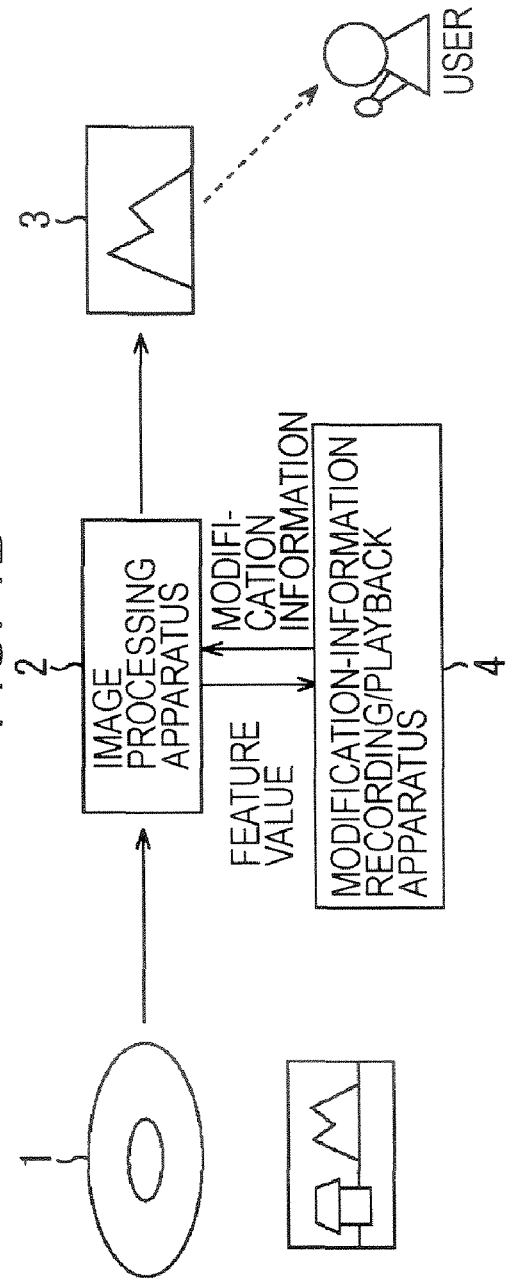

IMAGE PROCESSING SYSTEM AND METHOD THEREFOR, IMAGE PROCESSING APPARATUS AND METHOD, IMAGE CAPTURING APPARATUS AND METHOD, PROGRAM RECORDING MEDIUM, AND PROGRAM

CROSS REFERENCES TO RELATED APPLICATIONS

The present invention contains subject matter related to Japanese Patent Application JP 2006-052644 filed in the Japanese Patent Office on Feb. 28, 2006, the entire contents of which are incorporated herein by reference.

BACKGROUND OF THE INVENTION

1. Field of the Invention

The present invention relates to image processing systems and methods therefor, image processing apparatuses and methods, image capturing apparatuses and methods, program recording media, and programs. More specifically, the present invention relates to an image processing system and method therefor, an image processing apparatus and method, an image capturing apparatus and method, a program recording medium, and a program for modifying an image including a predetermined object so that an appropriate modification for the predetermined object can be performed.

2. Description of the Related Art

Techniques for easily processing images have become increasingly widespread.

One of the most common techniques for editing an image captured by an image capturing apparatus such as a video camera is known as linear editing. Linear editing applies various types of processing to the image while playing back the original image data, and records the processed image in a different recording medium.

A problem with linear editing is that if the original image data is "copy once" data, the image recorded in a video tape recorder (VTR) is not allowed to be recorded once it is played back and edited.

In order to address the problem, a method of storing an operation for specifying a process for editing an image is disclosed in Japanese Unexamined Patent Application Publication No. 2003-202944.

SUMMARY OF THE INVENTION

In linear editing, an image and a time code indicating the time of the image are simultaneously communicated, thereby editing the image according to the time code. In consumer VTRs and the like, however, the time code is contained within the VTRs, and it is in effect difficult to transmit the time code to the outside. Since an image is not synchronized with an operation for specifying a process for editing the image, it is difficult to apply the process to the image in precise synchronization with the playback of the image and to display the processed image even when the operation is simply stored.

If any technique other than the time code method can be used to synchronize an image with an operation for specifying a process for editing the image, the editing process is repeatedly performed on a user-by-user basis in order to edit the image differently depending on the user. For example, in order to edit a moving image of an athletic meet, a plurality of persons as objects often appear in the image. In such a moving image, the object to be positioned at the center of the image or at the center of the zoom is different depending on the user. Therefore, one moving image may be subjected to different editing operations according to the number of users, and it is considerably labor and time consuming to individually perform those editing operations.

It is therefore desirable to when a specific object is located in a captured image, apply an appropriate process for the specific object to the image. It is further desirable to apply a predetermined process to an image each time the image is played back for each object and to reproduce the processed image, without applying the process to the original image data, by storing the process to be applied to the image and a feature value of the image in association with each other.

An image processing system according to a first embodiment of the present invention includes an image capturing apparatus and an image processing apparatus. The image capturing apparatus includes image capturing means for capturing an image including an object, status-information obtaining means for obtaining status information of the object, and recording means for recording the image and the status information of the object. The image processing apparatus includes modification-details determining means for specifying details of a modification to be applied to the image according to the image and the status information of the object recorded by the recording means, setting means for setting setting information for modifying the image on the basis of the details of the modification specified by the modification-details determining means, first feature-value extracting means for extracting a feature value from the image, and recording means for recording the setting information in a setting-information recording medium in association with the feature value of the image extracted by the first feature-value extracting means.

The status information of the object may include position information of the object.

The image processing apparatus may further include determining means for determining whether or not the image includes a specific object according to the image and the position information of the object recorded by the recording means. When the determining means determines that the image includes the specific object, the modification-details determining means may specify details of a modification to be applied to the image.

The status-information obtaining means may obtain the position information of the object using a global positioning system (GPS).

The status-information obtaining means may obtain the position information of the object using an IC tag and a sensor.

The image capturing apparatus may further include combining means for combining the status information of the object with the image, and the recording means may record in an image recording medium the image with which the status information of the object is combined by the combining means. The image processing apparatus may further include separating means for separating the image and the status information from the image with which the status information of the object is combined by the combining means, and the modification-details determining means may specify details of a modification to be applied to the image according to the image and status information separated by the separating means.

The recording means may include image recording means for recording the image, second feature-value extracting means for extracting a feature value from the image, and status-information recording means for recording the status information of the object in association with the feature value extracted by the second feature-value extracting means The image recording means may be configured to record the image in an image recording medium, and the status-information recording means may be configured to record the status information of the object in a status-information recording medium in association with the feature value extracted by the second feature-value extracting means. The image processing apparatus may further include synchronizing means for synchronizing the feature value recorded in the status-information recording medium with the feature value extracted by the first feature-value extracting means, and obtaining means for obtaining the status information associated with the feature value synchronized by the synchronizing means from the status-information recording medium. The modification-details determining means may specify details of a modification to be applied to the image according to the image recorded on the image recording medium and the status information obtained by the obtaining means.

An image processing method for an image processing system including an image capturing apparatus and an image processing apparatus according to the first embodiment of the present invention includes the steps of by the image capturing apparatus, capturing an image including an object; by the image capturing apparatus, obtaining status information of the object; by the image capturing apparatus, recording the image and the status information of the object; by the image processing apparatus, specifying details of a modification to be applied to the image according to the image and the status information of the object recorded by the image capturing apparatus; by the image processing apparatus, setting setting information for modifying the image on the basis of the specified details of the modification; by the image processing apparatus, extracting a feature value from the image; and by the image processing apparatus, recording the setting information in a setting-information recording medium in association with the extracted feature value.

A program recording medium according to the first embodiment of the present invention stores a computer-readable program for controlling an image processing system including an image capturing apparatus and an image processing apparatus. The program includes a program for controlling the image capturing apparatus, including the steps of capturing an image including an object, obtaining status information of the object, and recording the image and the status information of the object; and a program for controlling the image processing apparatus, including the steps of specifying details of a modification to be applied to the image according to the image and the status information of the object recorded by the image capturing apparatus, setting setting information for modifying the image on the basis of the specified details of the modification, extracting a feature value from the image, and recording the setting information in a setting-information recording medium in association with the extracted feature value.

A program for a computer for controlling an image processing system including an image capturing apparatus and an image processing apparatus according to the first embodiment the present invention includes causing the computer to control the image capturing apparatus to execute a process including the steps of capturing an image including an object, obtaining status information of the object, and recording the image and the status information of the object; and causing the computer to control the image processing apparatus to execute a process including the steps of specifying details of a modification to be applied to the image according to the image and the status information of the object recorded by the image capturing apparatus, setting setting information for modifying the image on the basis of the specified details of the modification, extracting a feature value from the image, and recording the setting information in a setting-information recording medium in association with the extracted feature value.

An image processing apparatus according to a second embodiment of the present invention includes modification-details determining means for specifying details of a modification to be applied to an image according to a state of a specific object in the image, setting means for setting setting information for modifying the image on the basis of the details of the modification specified by the modification-details determining means, feature-value extracting means for extracting a feature value from the image, and recording means for recording the setting information in a setting-information recording medium in association with the feature value of the image extracted by the feature-value extracting means.

The image may include status information of each object in the image. The state of the specific object in the image may be based on the status information of each object in the image, and the modification-details determining means may specify details of a modification to be applied to the image according to the state of the specific object based on the status information of each object in the image.

The status information may include position information. The image processing apparatus may further include determining means for determining whether or not the specific object is located in the image and is in front of any other objects in the image on the basis of the position information of each object in the image to determine whether or not the image includes the specific object, and the modification-details determining means may specify details of a modification to be applied to the image on the basis of a determination result of the determining means.

The image processing apparatus may further include obtaining means for obtaining status information of each object in the image that is associated with the feature value of the image. The state of the specific object may be based on the status information of each object in the image that is associated with the feature value of the image, and the modification-details determining means may specify details of a modification to be applied to the image according to the state of the specific object based on the status information of each object in the image that is associated with the feature value of the image.

An image processing method according to the second embodiment of the present invention includes the steps of specifying details of a modification to be applied to an image according to a state of a specific object in the image, setting setting information for modifying the image on the basis of the specified details of the modification, extracting a feature value from the image, and recording the setting information in a setting-information recording medium in association with the extracted feature value of the image.

A program recording medium according to the second embodiment of the present invention stores a computer-readable program including the steps of specifying details of a modification to be applied to an image according to a state of a specific object in the image, setting setting information for modifying the image on the basis of the specified details of the modification, extracting a feature value from the image, and recording the setting information in a setting-information recording medium in association with the extracted feature value of the image.

A program according to the second embodiment of the present invention allows a computer to execute a process including the steps of specifying details of a modification to be applied to an image according to a state of a specific object in the image, setting setting information for modifying the image on the basis of the specified details of the modification, extracting a feature value from the image, and recording the setting information in a setting-information recording medium in association with the extracted feature value of the image.

An image capturing apparatus according to a third embodiment of the present invention includes image capturing means for capturing an image including an object, status-information obtaining means for obtaining status information of the object, and recording means for recording the image and the status information of the object.

The status information may include position information.

The status-information obtaining means may obtain the position information of the object using a global positioning system (GPS).

The status-information obtaining means may obtain the position information of the object using an IC tag and a sensor.

The image capturing apparatus may further include combining means for combining the status information of the object with the image, and the recording means may record in an image recording medium the image with which the status information of the object is combined by the combining means.

The recording means may include image recording means for recording the image, feature-value extracting means for extracting a feature value from the image, and status-information recording means for recording the status information of the object in association with the feature value extracted by the feature-value extracting means.

An image capturing method according to the third embodiment of the present invention includes the steps of capturing an image including an object, obtaining status information of the object, and recording the image and the status information of the object.

A program recording medium according to the third embodiment of the present invention stores a computer-readable program including the steps of capturing an image including an object, obtaining status information of the object, and recording the image and the status information of the object.

A program according to the third embodiment of the present invention allows a computer to execute a process including the steps of capturing an image including an object, obtaining status information of the object, and recording the image and the status information of the object.

In the image processing system and method therefor, and program according to the first embodiment of the present invention, the image capturing apparatus is configured to capture an image including an object, to obtain status information of the object, and to record the image and the status information of the object; and the image processing apparatus is configured to specify details of a modification to be applied to the image on the basis of the recorded image and status information of the object, to set setting information for modifying the image on the basis of the details of the modification, to extract a feature value from the image, and to record the setting information in a setting-information recording medium in association with the extracted feature value of the image.

In the image processing apparatus and method, and program according to the second embodiment of the present invention, details of a modification to be applied to an image is specified according to a state of a specific object in the image; setting information for modifying the image is set on the basis of the specified details of the modification; a feature value is extracted from the image; and the setting information is recorded in a setting-information recording medium in association with the feature value of the image.

In the image capturing apparatus and method, and program according to the third embodiment of the present invention, an image including an object is captured; status information of the object is obtained; and the image and the state of the object are recorded.

The image processing apparatus and the image capturing apparatus according to the above-described embodiments of the present invention may be independent apparatuses or may constitute a block configured to perform both an image processing operation and an image capturing operation.

According to the first embodiment of the present invention, a captured image and position information of objects can be recorded. Therefore, when a specific object is located in the image, a predetermined process can be applied to the image each time the image is played back, and the processed image can be reproduced without applying the process to the original image data. Further, even image data that is not allowed to be copied can be subjected to the same process each time the image data is played back, and the processed image can be repeatedly played back.

According to the first embodiment of the present invention, furthermore, a captured image and position information of objects can be recorded. Based on the image and the position information of the objects, when a specific object is located in the image, setting information for processing an image corresponding to the specific object to an image can be recorded in association with a feature value of the image.

According to the second embodiment of the present invention, when a specific object is located in an image, a predetermined process can be applied to the image each time the image is played back, and the processed image can be reproduced without applying the process to the original image data. Further, even image data that is not allowed to be copied is can be subjected to the same process each time the image data is played back, and the processed image can be repeatedly played back.

According to the second embodiment of the present invention, furthermore, when a specific object is located in an image, setting information for processing an image corresponding to the specific object can be recorded in association with a feature value of the image.

According to the third embodiment of the present invention, when an image is captured, position information of an object can be recorded in association with the image.

According to the third embodiment of the present invention, furthermore, when an image is captured, position information of an object can be recorded in accordance with the recording timing of the image.

BRIEF DESCRIPTION OF THE DRAWINGS

FIGS. 1A and 1B are diagrams showing the concept of an image processing apparatus according to an embodiment of the present invention;

DESCRIPTION OF THE PREFERRED EMBODIMENTS

Figure 2:
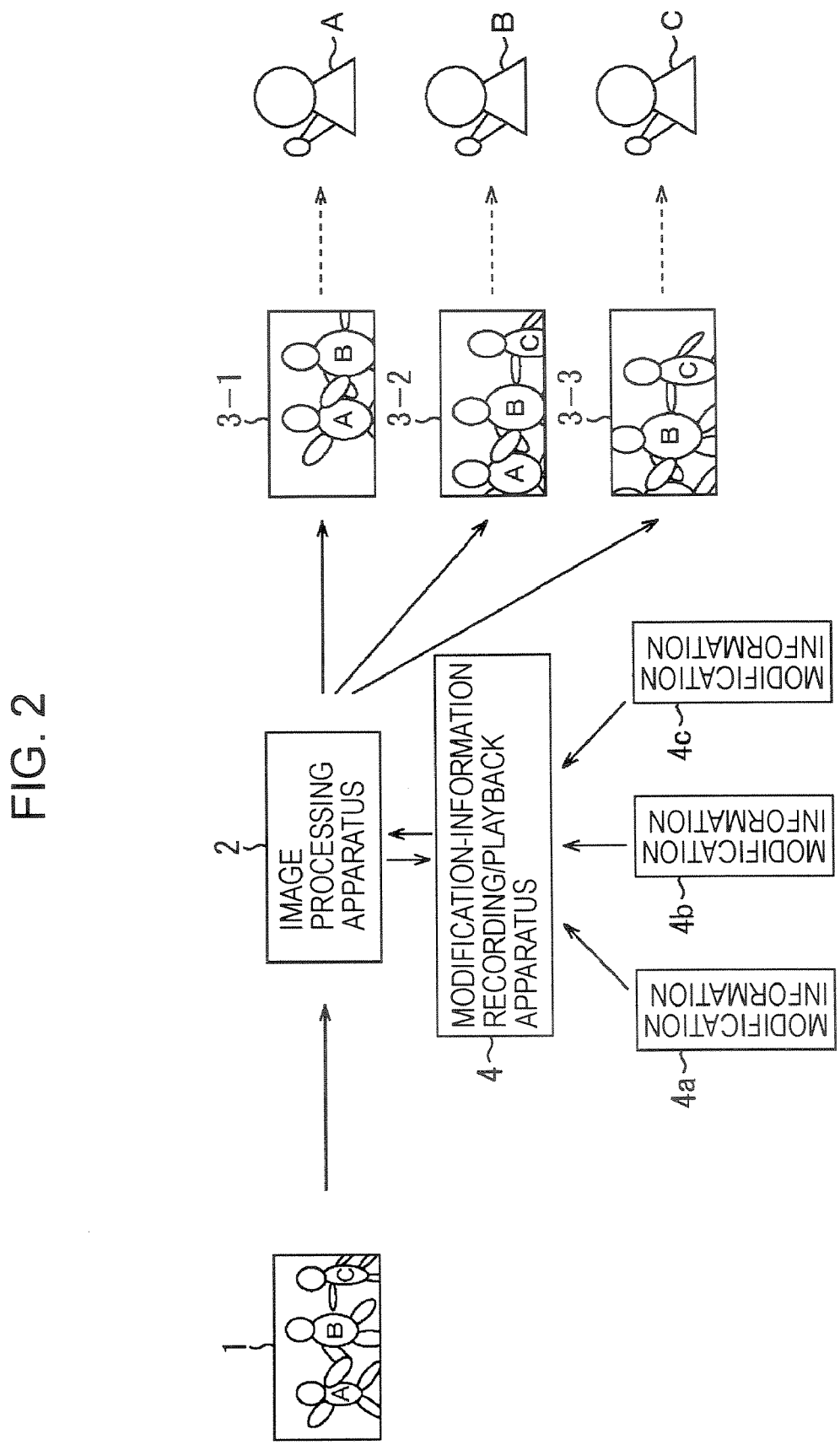
FIG. 2 is a diagram showing the concept of the image processing apparatus according to the embodiment of the present invention.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the embodiments of the invention disclosed in the embodiments are described in the claims. That is, the description does not deny the existence of embodiments of the present invention that are described in the embodiments but not claimed in the invention of this application, i.e., the existence of embodiments of the present invention that in future may be claimed by a divisional application, or that may be additionally claimed through amendments.

An image processing system according to a first embodiment of the present invention includes an image capturing apparatus and an image processing apparatus. The image capturing apparatus includes image capturing means (e.g., an image capturing unit 12 shown in FIG. 3) for capturing an image including an object, status-information obtaining means (e.g., a position-information obtaining unit 13 shown in FIG. 3) for obtaining status information of the object, and recording means (e.g., a video recorder 15 shown in FIG. 3) for recording the image and the status information of the object. The image processing apparatus includes modification-details determining means (e.g., a modification-details determining unit 44 shown in FIG. 6) for specifying details of a modification to be applied to the image according to the image and the status information of the object recorded by the recording means, setting means (e.g., a setting-information determining unit 69 shown in FIG. 7) for setting setting information for modifying the image on the basis of the details of the modification specified by the modification-details determining means, first feature-value extracting means (e.g., a feature value extractor 61 shown in FIG. 7) for extracting a feature value from the image, and recording means (e.g., a feature-value setting-information recorder 63 shown in FIG. 7) for recording the setting information in a setting-information recording medium in association with the feature value of the image extracted by the first feature-value extracting means.

The status information of the object may include position information of the object.

The image processing apparatus may further include determining means (e.g., a modification determiner 43 shown in FIG. 6) for determining whether or not the image includes a specific object according to the image and the position information of the object recorded by the recording means. When the determining means determines that the image includes the specific object, the modification-details determining means (e.g., a modification-details determining unit 44 shown in FIG. 6) may specify details of a modification to be applied to the image.

Figure 5:
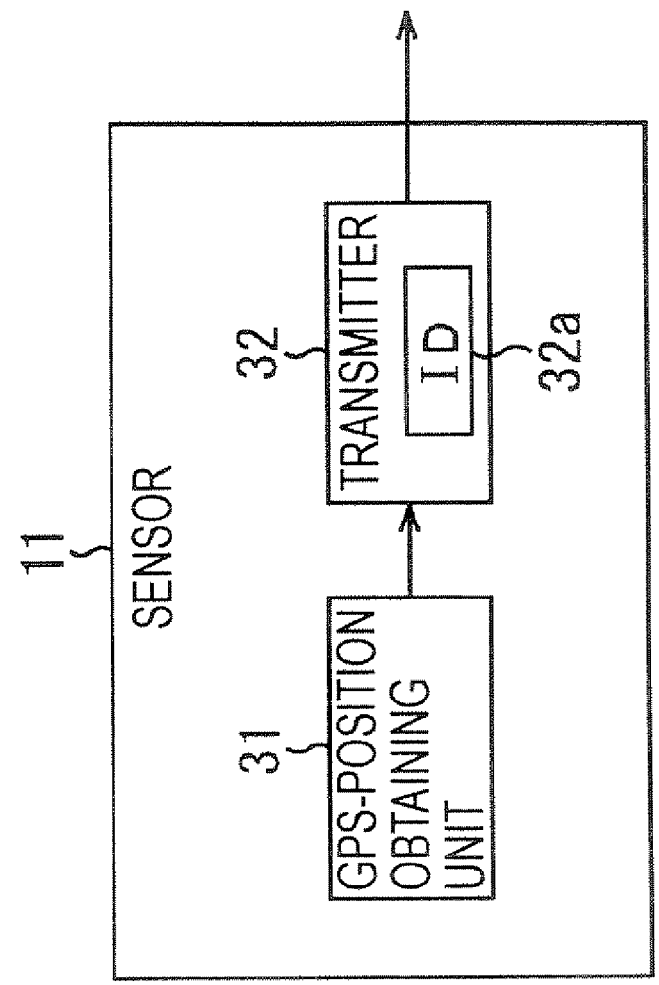
FIG. 5 is a block diagram showing the structure of a sensor in the image recording apparatus shown in FIG. 3.

The status-information obtaining means may obtain the position information of the object using a global positioning system (e.g., a GPS-position obtaining unit 31 shown in FIG. 5).

The status-information obtaining means may obtain the position information of the object using an IC tag and a sensor.

The image capturing apparatus may further include combining means (e.g., a combiner 14 shown in FIG. 3) for combining the status information of the object with the image, and the recording means may record in an image recording medium the image with which the status information of the object is combined by the combining means. The image processing apparatus may further include separating means for separating the image and the status information from the image with which the status information of the object is combined by the combining means, and the modification-details determining means may specify details of a modification to be applied to the image according to the image and status information separated by the separating means.

The recording means may include image recording means (e.g., a video recorder 201 shown in FIG. 21) for recording the image, second feature-value extracting means (e.g., a feature value extractor 202 shown in FIG. 21) for extracting a feature value from the image, and status-information recording means (e.g., a position-information recording device 203 shown in FIG. 21) for recording the status information of the object in association with the feature value extracted by the second feature-value extracting means. The image recording means may be configured to record the image in an image recording medium, and the status-information recording means may be configured to record the status information of the object in a status-information recording medium in association with the feature value extracted by the second feature-value extracting means. The image processing apparatus may further include synchronizing means (e.g., a synchronization detector 62 shown in FIG. 23) for synchronizing the feature value recorded in the status-information recording medium with the feature value extracted by the first feature-value extracting means, and obtaining means for obtaining the status information associated with the feature value synchronized by the synchronizing means from the status-information recording medium. The modification-details determining means may specify details of a modification to be applied to the image according to the image recorded on the image recording medium and the status information obtained by the obtaining means.

An image processing method and program for an image processing system including an image capturing apparatus and an image processing apparatus according to the first embodiment of the present invention includes the steps of by the image capturing apparatus, capturing (e.g., step S11 of the flowchart shown in FIG. 11) an image including an object; by the image capturing apparatus, obtaining (e.g., step S13 of the flowchart shown in FIG. 11) status information of the object; by the image capturing apparatus, recording (e.g., step S15 of the flowchart shown in FIG. 11) the image and the status information of the object; by the image processing apparatus, specifying (e.g., step S46 of the flowchart shown in FIG. 13) details of a modification to be applied to the image according to the image and the status information of the object recorded by the image capturing apparatus; by the image processing apparatus, setting (e.g., step S64 of the flowchart shown in FIG. 15) setting information for modifying the image on the basis of the specified details of the modification; by the image processing apparatus, extracting a feature value from the image; by the image processing apparatus, and recording (e.g., step S65 of the flowchart shown in FIG. 15) the setting information in a setting-information recording medium in association with the extracted feature value.

Figure 6:
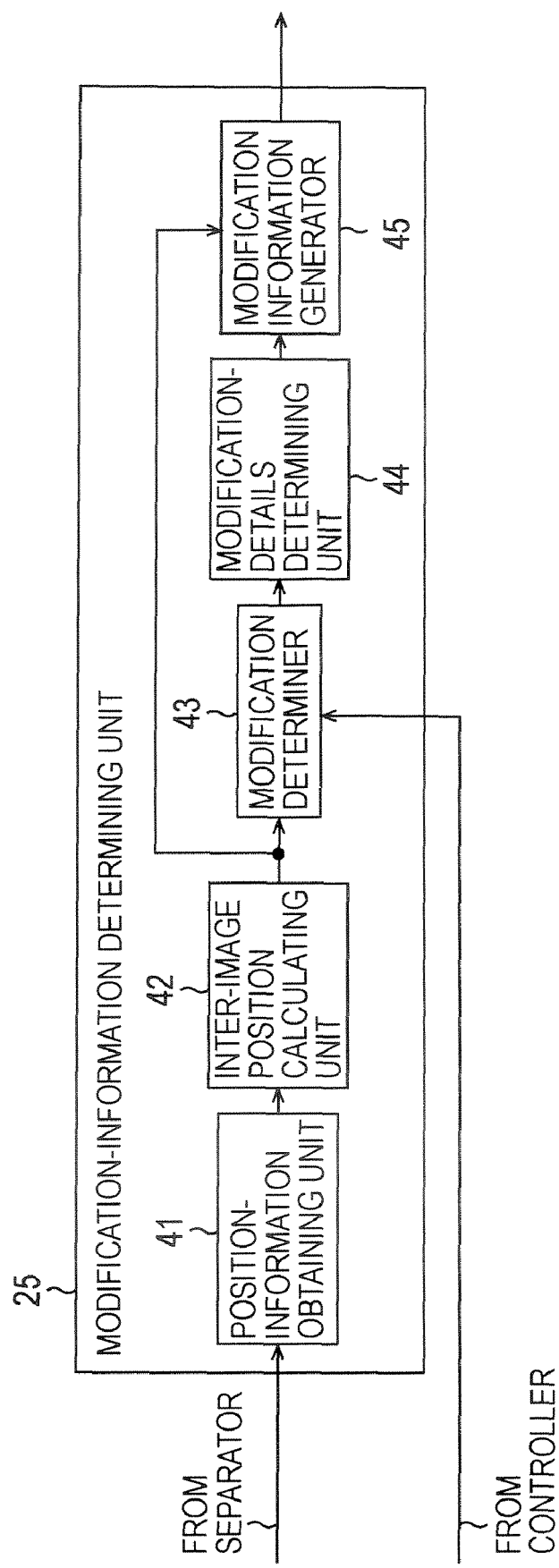
FIG. 6 is a block diagram showing an example structure of a modification-information determining unit in the image processing apparatus shown in FIG. 4.
Figure 7:
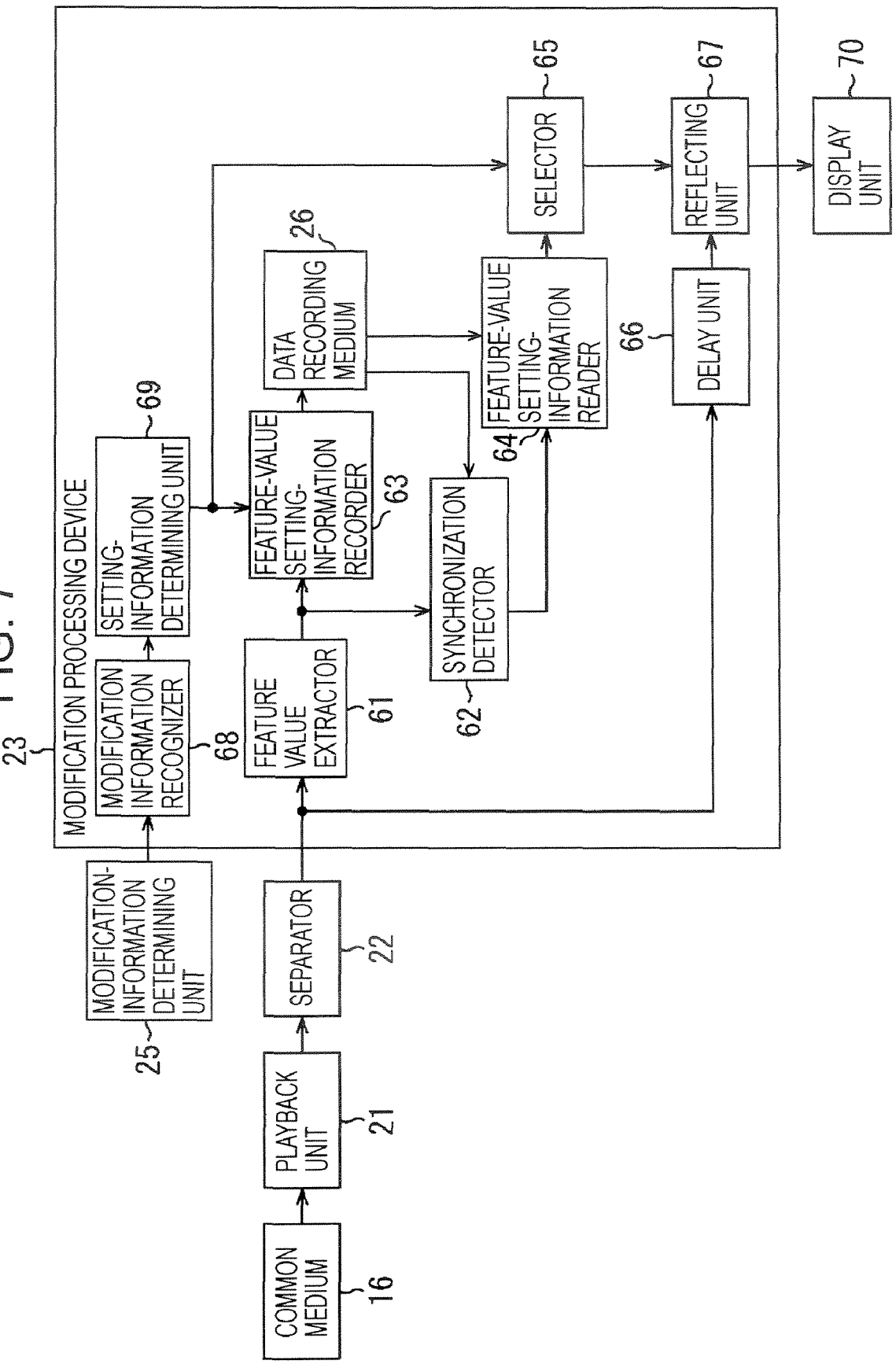
FIG. 7 is a block diagram showing an example structure of a modification processing device in the image processing apparatus shown in FIG. 4.

An image processing apparatus according to a second embodiment of the present invention includes modification-details determining means (e.g., a modification-details determining unit 44 shown in FIG. 6) for specifying details of a modification to be applied to an image according to a state of a specific object in the image, setting means (e.g., a setting-information determining unit 69 shown in FIG. 7) for setting setting information for modifying the image on the basis of the details of the modification specified by the modification-details determining means, feature-value extracting means (e.g., a feature value extractor 61 shown in FIG. 7) for extracting a feature value from the image, and recording means (e.g., a feature-value setting-information recorder 63 shown in FIG. 7) for recording the setting information in a setting-information recording medium (e.g., a data recording medium 26 shown in FIG. 7) in association with the feature value of the image extracted by the feature-value extracting means.

The image may include status information of each object in the image. The state of the specific object in the image may be based on the status information of each object in the image, and the modification-details determining means (e.g., a modification-details determining unit 44 shown in FIG. 6) may specify details of a modification to be applied to the image according to the state of the specific object based on the status information of each object in the image.

The status information may include position information. The image processing apparatus may further include determining means (e.g., a modification determiner 43 shown in FIG. 6) for determining whether or not the specific object is located in the image and is in front of any other objects in the image on the basis of the position information of each object in the image to determine whether or not the image includes the specific object, and the modification-details determining means (e.g., a modification-details determining unit 44 shown in FIG. 6) may specify details of a modification to be applied to the image on the basis of a determination result of the determining means.

The image processing apparatus may further include obtaining means (e.g., a position-information obtaining unit 41 shown in FIG. 6) for obtaining status information of each object in the image that is associated with the feature value of the image. The state of the specific object may be based on the status information of each object in the image that is associated with the feature value of the image, and the modification-details determining means (e.g., a modification-details determining unit 44 shown in FIG. 6) may specify details of a modification to be applied to the image according to the state of the specific object based on the status information of each object in the image that is associated with the feature value of the image.

An image processing method and program according to the second embodiment of the present invention includes the steps of specifying (e.g., step S46 of the flowchart shown in FIG. 13) details of a modification to be applied to an image when a specific object is included in the image, setting (e.g., step S64 of the flowchart shown in FIG. 15) setting information for modifying the image on the basis of the specified details of the modification, extracting a feature value from the image, and recording (e.g., step S65 of the flowchart shown in FIG. 15) the setting information in a setting-information recording medium in association with the extracted feature value of the image.

An image capturing apparatus according to a third embodiment of the present invention includes image capturing means (e.g., an image capturing unit 12 shown in FIG. 3) for capturing an image including an object, status-information obtaining means (e.g., a position-information obtaining unit 13 shown in FIG. 3) for obtaining status information of the object, and recording means (e.g., a video recorder 15 shown in FIG. 3) for recording the image and the status information of the object.

The status information may include position information.

The status-information obtaining means may obtain the position information of the object using a global positioning system (e.g., GPS-position obtaining 31 shown in FIG. 5).

The status-information obtaining means may obtain the position information of the object using an IC tag and a sensor.

The image capturing apparatus may further include combining means (e.g., a combiner 14 shown in FIG. 3) for combining the status information of the object with the image, and the recording means may record in an image recording medium the image with which the status information of the object is combined by the combining means.

The recording means may include image recording means (e.g., a video recorder 201 shown in FIG. 21) for recording the image, feature-value extracting means (e.g., a feature value extractor 202 shown in FIG. 21) for extracting a feature value from the image, and status-information recording means (e.g., position-information recording device 203 shown in FIG. 21) for recording the status information of the object in association with the feature value extracted by the feature-value extracting means.

An image capturing method and program according to the third embodiment of the present invention includes the steps of capturing (e.g., step S11 of the flowchart shown in FIG. 11) an image including an object, obtaining (e.g., step S13 of the flowchart shown in FIG. 11) status information of the object, and recording (e.g., step S15 of the flowchart shown in FIG. 11) the image and the status information of the object.

The concept of an image processing apparatus according to an embodiment of the present invention will be described with reference to FIGS. 1A and 1B. An image processing apparatus 2 according to an embodiment of the present invention is configured to perform a process specified by a user to be applied to a pre-recorded image and to display the processed image. Specifically, the image processing apparatus 2 extracts a feature value of the image, and stores modification information indicating the details of a modification in association with the feature value. Further, when playing back the pre-recorded image, the image processing apparatus 2 reads the stored modification information to apply the modification to the image, and displays the modified image.

More specifically, the image processing apparatus 2 has roughly two operation modes, i.e., a recording mode and a playback mode.

In the recording mode, as shown in FIG. 1A, the image processing apparatus 2 displays on a display unit 3 an image played back from a recording medium 1 having content including a moving image pre-recorded therein, such as a digital versatile disc (DVD), using a DVD player or the like. When a user operates a remote controller or the like to specify a desired modification to be applied to the image in this state, such as zoom, pan, or tilt, the image processing apparatus 2 generates modification information corresponding to the operation, and applies the modification associated with the modification information to the image to display the modified image on the display 3. The image processing apparatus 2 further extracts a feature value from the image, and stores modification information in association with the extracted feature value in a modification-information recording/playback apparatus 4.

In the playback mode, as shown in FIG. 1B, the image processing apparatus 2 reads an image played back from the recording medium 1 having content including a moving image pre-recorded therein using a DVD player or the like, and extracts a feature value. The image processing apparatus 2 reads modification information recorded in association with the feature value in the modification-information recording/playback apparatus 4 in synchronization with the feature value of the image read from the recording medium 1, and performs a modification process on the image on the basis of the read modification information to display the modified image on the display unit 3.

By performing the above-described operation, the image processing apparatus 2 can store only the details of a modification to be applied to a pre-recorded image, and can repeatedly play back the modified image without recording the modified image itself. Therefore, a pre-recorded image that can be copied a limited number of times, such as a "copy once" image, can be repeatedly subjected to modifications such as various types of image processing. In FIGS. 1A and 1B, by way of example, the image recorded in the recording medium 1 includes a mountain and a house. A modification process for enlarging the mountain in the image is specified, and the image of the enlarged mountain is displayed on the display unit 3.

Accordingly, the image processing apparatus 2 is configured to apply a modification process to an image recorded in the recording medium 1, which is an original image, using the stored modification information and to display the modified image. Thus, the modification information is changed to apply modifications to the image recorded in the recording medium 1 to produce various modified images, and the images can be displayed.

As shown in FIG. 2, when the recording medium 1 has recorded therein captured image showing users A to C, the image processing apparatus 2 is further configured to determine whether or not each of the users A to C as objects is included in the image, to generate predetermined modification information for each of the objects, to perform a modification process on the image on the basis of the generated modification information, and to display the results as images displayed on display units 3-1 to 3-3. Although in FIG. 2, the display units 3-1 to 3-3 are represented by different reference numerals in order to identify different display styles, the images are displayed on the same display unit 3. In FIG. 2, pieces of modification information 4a to 4c are provided, and the image processing apparatus 2 applies a predetermined modification process, such as a modification process for zooming into each of the users A to C to display each of the users A to C at the center of the image, to the image recorded in the recording medium 1 on the basis of each of the pieces of modification information 4a to 4c to display the results on the display units 3-1 to 3-3.

As a consequence, the image processing apparatus 2 can generate modification information according to an object in an image, and can display a modified result. Thus, the users A to C can use the recording medium 1 and the respective pieces of modification information 4a to 4c to view the same image captured and recorded in the recording medium 1 as processing results based on the respective pieces of modification information 4a to 4c without performing an irreversible operation. Each of the users A to C can therefore appreciate the image like an image whose focus is that user. With a combination of the recording medium 1 and the pieces of modification information 4a to 4c, an image played back using such a combination is of added value to each of the users A to C, and sales effectiveness of the recording medium 1 can therefore be enhanced.

The image processing apparatus 2 shown in FIGS. 1A to 2 will be described in detail.

Figure 3:
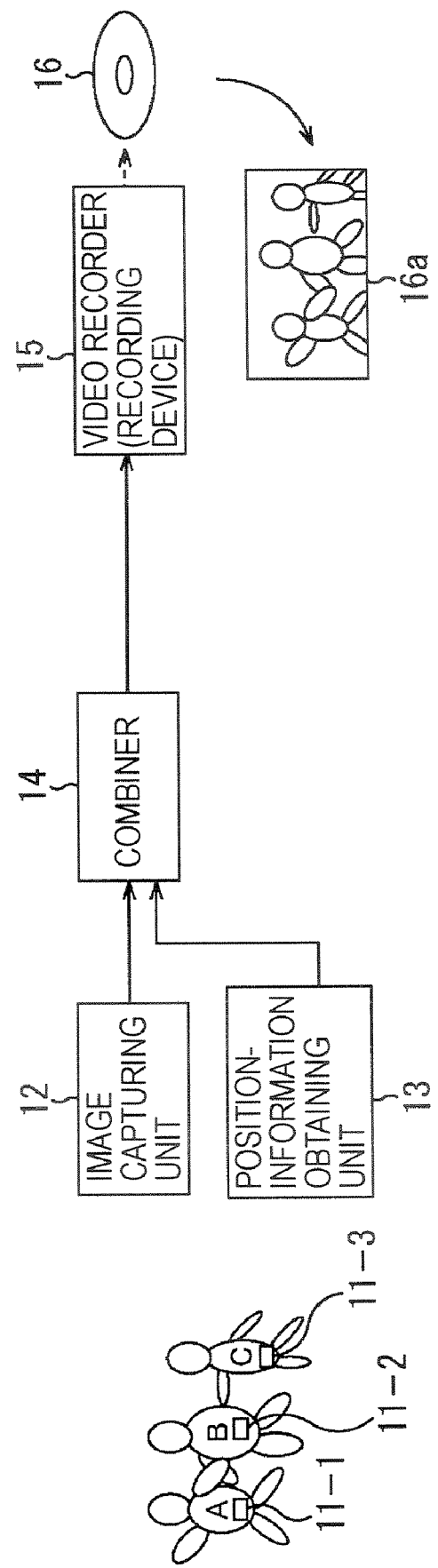
FIG. 3 is a block diagram showing the structure of an image recording apparatus according to an embodiment of the present invention.

FIG. 3 is a diagram showing the structure of an image recording apparatus of an embodiment of the present invention that generates a common medium 16 corresponding to the recording medium 1 shown in FIGS. 1A to 2.

The users A to C are objects of an image recorded in the common medium 16, and sensors 11-1 to 11-3, respectively. Each of the sensors 11-1 to 11-3 obtains position information using a global positioning system (GPS), and transmits the position information to a position-information obtaining unit 13. For example, it is assumed that the users A to C desire to purchase the above-described modification information and have the sensors 11-1 to 11-3 in advance, respectively. The sensors 11-1 to 11-3 are collectively referred to as a "sensor 11" or are referred to as "sensors 11" unless they are individually identified, and the other elements are referred to likewise. The structure of the sensor 11 is described in detail below with reference to FIG. 5.

An image capturing unit 12 photoelectrically converts incident light into an electrical signal using image pickup elements such as charge coupled device (CCD) elements or complementary metal-oxide semiconductor (CMOS) elements to capture an image, and supplies the image to a combiner 14 as image data.

The position-information obtaining unit 13 obtains the position information supplied from the sensor 11, and supplies it to the combiner 14. The combiner 14 combines the position information supplied from the position-information obtaining unit 13 with the image data supplied from the image capturing unit 12, and supplies the result to a video recorder 15. The video recorder 15 encodes the image data with the combined position information in a predetermined recording format, and records the encoded image data in a recording medium such as a DVD-R to generate the common medium 16.

The structure of an image processing apparatus of an embodiment of the present invention that applies a modification process to the common medium 16 generated by the image recording apparatus corresponding to the image processing apparatus 2 shown in FIGS. 1A to 2 will be described with reference to FIG. 4.

A playback unit 21 reads and decodes the image data with the combined position information that is encoded in the predetermined format and recorded in the common medium 16, and supplies the decoded image data to a separator 22. The separator 22 separates the pieces of position information from the image data supplied from the playback unit 21, and supplies the image data to a modification processing device 23 and the position information to a modification-information determining unit 25.

The modification-information determining unit 25 determines a position within the captured image on the basis of position information of each of the sensors 11 supplied from the separator 22, and determines whether or not a modification-target user that is input via a controller 24 is displayed in the image on the basis of the position information provided for the modification-target user. If the modification-target user is displayed in the image, the modification-information determining unit 25 determines a modification to be applied to the image to generate modification information corresponding to the modification, and supplied the modification information to the modification processing device 23. The structure of the modification-information determining unit 25 is described in detail below with reference to FIG. 6.

The modification processing device 23 determines setting information for applying the modification process to the image supplied from the separator 22 on the basis of the modification information supplied from the modification-information determining unit 25, and applies the modification process to the image on the basis of the determined setting information to display the modified image. Further, the modification processing device 23 records the setting information in a data recording medium 26 in association with a feature value of the image. The structure of the modification processing device 23 is described in detail below with reference to FIG. 7.

The data recording medium 26 is a removable medium that can be placed in or removed from the modification processing device 23, and is configured to store setting information necessary for a modification process of an image for each of the sensors 11, i.e., in units of users serving as objects. Thus, a plurality of data recording media 26 may be placed into a plurality of slots (not shown) for individual users. Alternatively, setting information for all users may be separately recorded in one data recording medium 26 in form of a separate file or folder for each of the users.

The structure of the sensor 11 according to an embodiment of the present invention will be described with reference to FIG. 5.

A GPS-position obtaining unit 31 receives radio waves emitted from geodetic satellites to obtain position information (longitude/latitude) on the Earth, and supplies the position information to a transmitter 32. The transmitter 32 adds an ID 32a unique to the sensor 11 to the position information supplied from the GPS-position obtaining unit 31, and then transmits the position information. Since the position information includes the ID 32a, position information of each of the sensors 11 can be identified. In other words, position information of each user can be identified by the ID 32a.

The structure of the modification-information determining unit 25 according to an embodiment of the present invention will be described with reference to FIG. 6.

A position-information obtaining unit 41 obtains all pieces of position information supplied from the separator 22, and supplies them to an inter-image position calculating unit 42. The inter-image position calculating unit 42 calculates a position within the image captured by the image capturing unit 12 on the basis of each of the pieces of position information supplied from the position-information obtaining unit 41. The image capturing unit 12 is a fixed camera whose position on the Earth and photographing direction are fixed, and the angle of view of an image obtained by the image capturing unit 12 is defined in advance. Thus, the inter-image position calculating unit 42 calculates the positions of the users displayed in the image captured by the image capturing unit 12 from the pieces of position information of the sensors 11, and supplies calculation results to a modification determiner 43 and a modification information generator 45.

The modification determiner 43 determines whether or not the modification-target user supplied via the controller 24 is located in the image and is in front of the image capturing unit 12 more than any other objects from the calculated positions within the image supplied from the inter-image position calculating unit 42 on the basis of the information of the modification-target user. If the modification-target user is located in the image and is in front of the image capturing unit 12 more than any other objects, the modification determiner 43 issues a modification instruction, and supplies the information of the modification-target user to a modification-details determining unit 44.

The modification-details determining unit 44 determines the details of a modification in response to a modification instruction received from the modification determiner 43 together with the information of the modification-target user. More specifically, for example, the modification-details determining unit 44 determines a modification for enlarging an object having the position information corresponding to the ID 32a of the sensor 11-1 of the user A so that the object can be positioned at the center of the image, and supplies the determined modification to the modification information generator 45. The modification information generator 45 generates specific information for the modification processing device 23 to modify the image on the basis of the information of the details of the modification supplied from the modification-details determining unit 44 and the position within the image calculated by the inter-image position calculating unit 42, and supplies the generated information to the modification processing device 23. More specifically, for example, the modification information generator 45 supplies modification information, such as the center pixel position within the original image and the magnification, to the modification processing device 23.

The structure of the modification processing device 23 according to an embodiment of the present invention will be described with reference to FIG. 7.

A feature value extractor 61 extracts a feature value of one of the images sequentially supplied from the playback unit 21, and supplies the feature value to a synchronization detector 62 and a feature-value setting-information recorder 63. The structure of the feature value extractor 61 is described in detail below with reference to FIG. 8.

A modification-information recognizer 68 recognizes modification information, and supplies information indicating the details of the modification process as a recognition result to a setting-information determining unit 69.

The setting-information determining unit 69 determines setting information for giving an instruction for the details of the modification process to be applied to the image to a reflecting unit 67, described below, on the basis of the information indicating the details of the modification process supplied from the modification-information recognizer 68, and supplies the setting information to the feature-value setting-information recorder 63 and a selector 65.

The feature-value setting-information recorder 63 stores the feature value supplied from the feature value extractor 61 and the setting information supplied from the setting-information determining unit 69 in association with each other in the data recording medium 26 (corresponding to the modification-information recording/playback apparatus 4 shown in FIGS. 1A to 2).

The synchronization detector 62 searches feature values stored in the data recording medium 26 (search-position feature values, described below) to find a feature value of an image being currently played back by the playback unit 21 (playback-position feature value, described below) that is supplied from the feature value extractor 61. When the same feature value is detected, the synchronization detector 62 supplies the detection result to a feature-value setting-information reader 64 as an image synchronization position. The structure of the synchronization detector 62 is described in detail below with reference to FIG. 10.

Upon obtaining the feature value (search-position feature value) detected as the synchronization position by the synchronization detector 62, the feature-value setting-information reader 64 reads the setting information stored in association with the feature value in the data recording medium 26, and supplies the read setting information to the selector 65. In a case where setting information is supplied from the setting-information determining unit 69, even if setting information is supplied at the same time from the feature-value setting-information reader 64, the selector 65 supplies the setting information supplied from the setting-information determining unit 69 to the reflecting unit 67. If no setting information is supplied from the setting-information determining unit 69 and setting information is supplied from the feature-value setting-information reader 64, the selector 65 supplies the setting information supplied from the feature-value setting-information reader 64 to the reflecting unit 67. If no setting information is supplied from the setting-information determining unit 69 or the feature-value setting-information reader 64, the selector 65 does not supply setting information to the reflecting unit 67.

A delay unit 66 temporarily stores the supplied image for a delay period in the operation of the feature value extractor 61, the synchronization detector 62, and the selector 65 before outputting the image to the reflecting unit 67. If setting information is supplied from the selector 65, the reflecting unit 67 reflects the process to be applied to the image supplied from the delay unit 66 in the image, and displays the processed image on a display unit 70. If no setting information is supplied from the selector 65, the reflecting unit 67 displays the image supplied from the delay unit 66 on the display unit 70 without changing the image.

Figure 8:
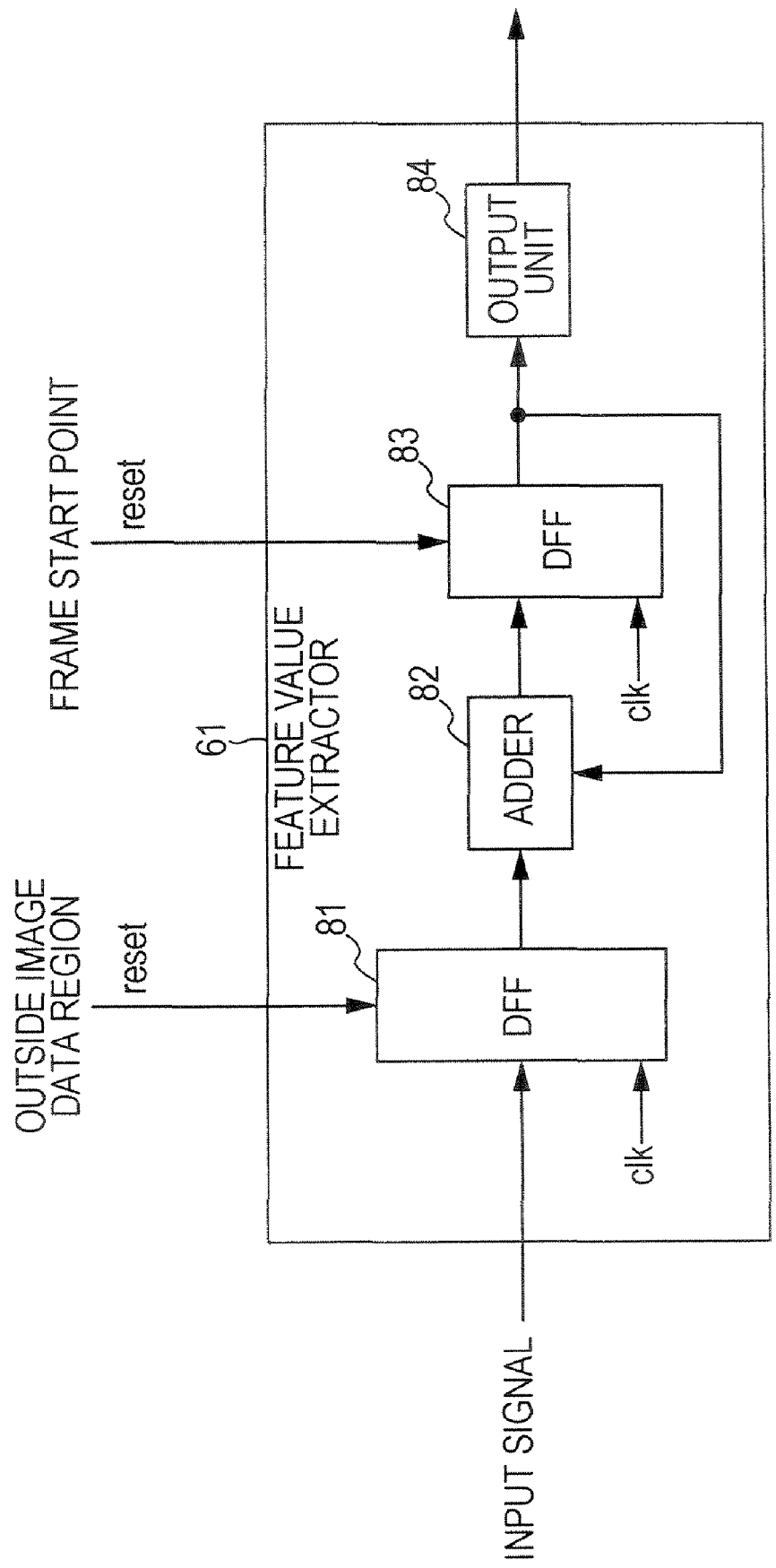
FIG. 8 is a diagram showing an example structure of a feature value extractor in the modification processing device shown in FIG. 7.

The structure of the feature value extractor 61 will be described in detail with reference to FIG. 8.

Figure 9:
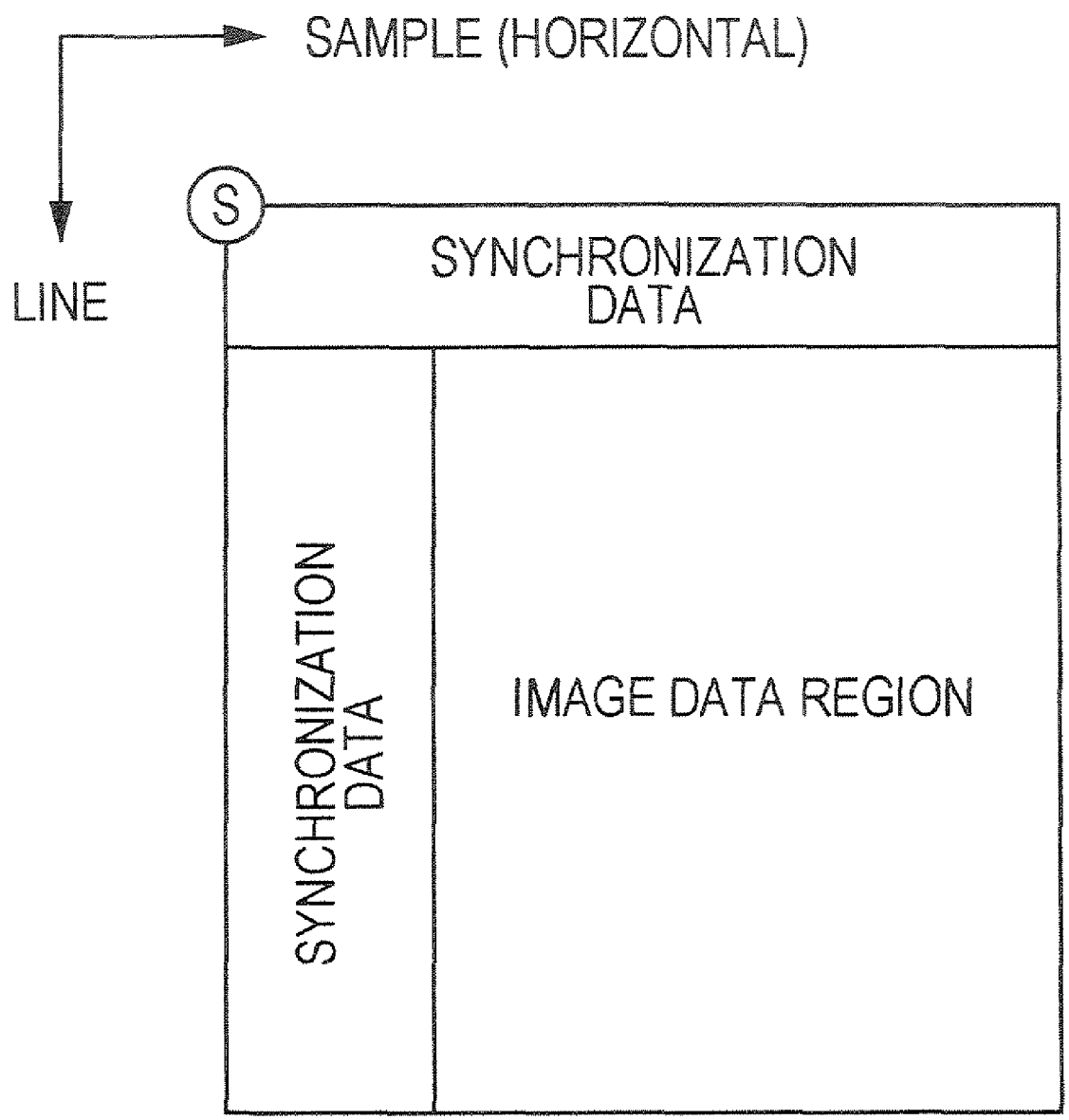
FIG. 9 is a diagram showing an example structure of an image signal.

A D-type flip flop (DFF) 81 stores an immediately preceding input signal, and outputs the input signal to an adder 82 at a time when a clock signal (clk) is input from a clock signal generator (not shown). If the input signal is outside an image data region of the image signal, a reset signal is input to the DFF 81 to delete the input signal, and no input signal is output. That is, as shown in FIG. 9, the image signal includes a synchronization data region and an image data region. Based on positional information sequentially input starting from a frame start point S, which is the circled origin of horizontal samples and vertical lines shown in FIG. 9, when the input signal is synchronization data outside the image data region, a reset signal is input to the DFF 81, and the signal constituting the synchronization data is not output to the adder 82. In other words, of the input signals constituting the image, only data within the image data region is supplied by the DFF 81 in synchronization with the clock signal to the adder 82.

The adder 82 adds the signal supplied from the DFF 81 and a signal supplied from a DFF 83, and outputs the sum to the DFF 83. More specifically, the adder 82 extracts the eight least significant bits of the sum of the signal supplied from the DFF 81 and the signal supplied from the DFF 83, and outputs the extracted eight bits to the DFF 83.

The DFF 83 supplies the signal supplied from the adder 82 to the adder 82 and an output unit 84 at a time when a clock signal (clk) generated by a clock generator (not shown) is input to the DFF 83. If a signal at the frame start point S (the circled origin of the horizontal samples and the vertical lines shown in FIG. 9) is input to the DFF 83, a reset signal is input to the DFF 83 to delete the input signal, and no input signal is output. That is, of the input signals constituting the image, only data within the image data region is accumulatively added by the adder 82, and the DFF 83 supplies the sum obtained by the addition to the output unit 84.

When a value for one frame (or one field) is supplied from the DFF 83 to the output unit 84, the output unit 84 outputs the value as a feature value of an image of one frame (or that field). That is, the output unit 84 outputs, as the feature value for that frame (or field), the eight least significant bits of the value that is obtained by the adder 82 by accumulatively adding only data within the image data region. The feature value may be any information that can be used to identify an image in units of frames, and is not limited to the eight least significant bits of the value determined by accumulatively adding only data within the image data region (only pixel values). Alternatively, for example, the sum of pixel values within a predetermined region near the center of the image data region may be used as a feature value.

Figure 10:
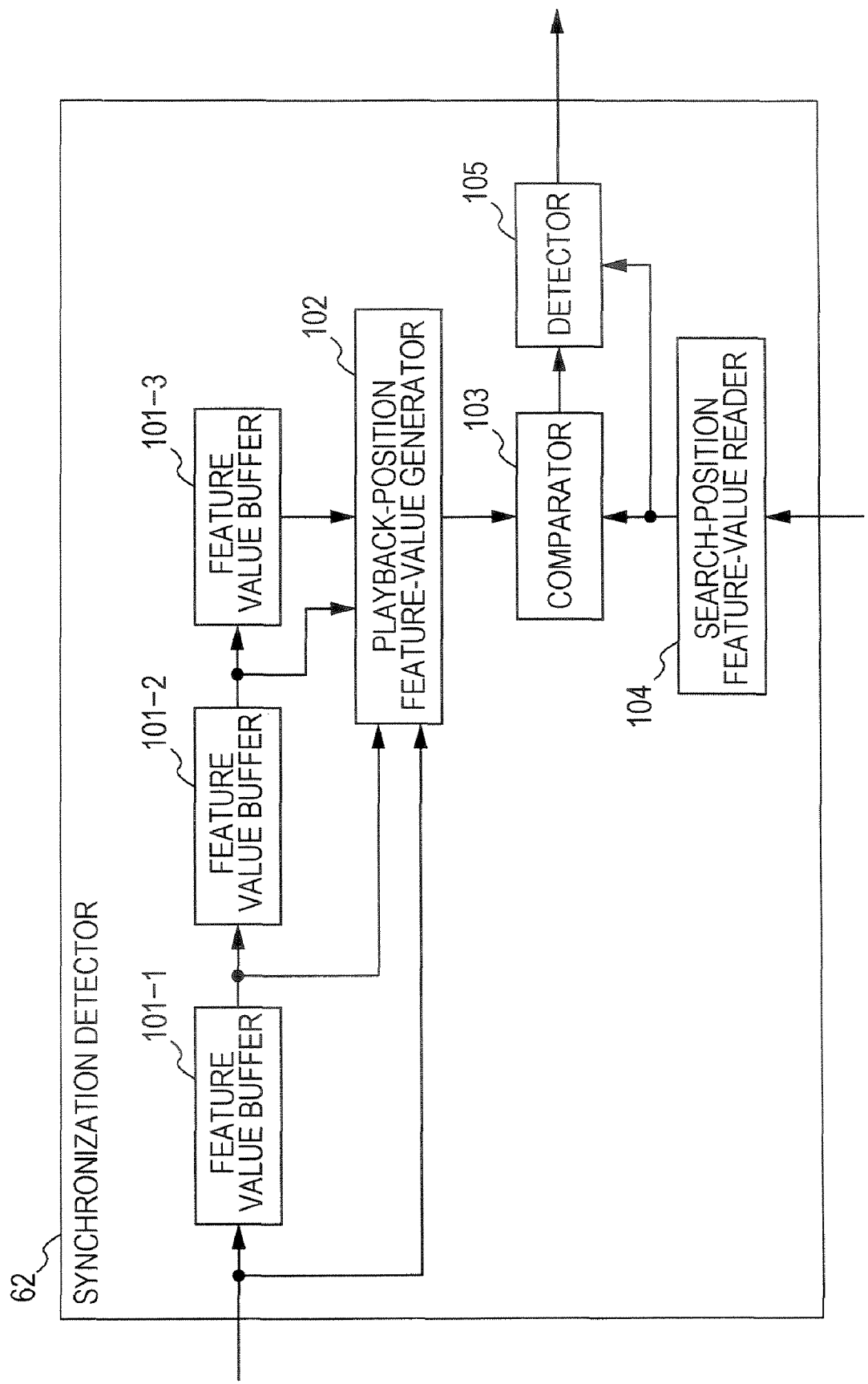
FIG. 10 is a block diagram showing an example structure of a synchronization detector in the modification processing device shown in FIG. 7.

The structure of the synchronization detector 62 will be described in detailed with reference to FIG. 10.

Each of feature value buffers 101-1 to 101-3 temporarily stores the supplied feature value, and sequentially outputs the stored feature value to a playback-position feature-value generator 102 and the feature value buffer 101-2 or 101-3 at the subsequent stage. Since there is no feature value buffer 101 subsequent to the feature value buffer 101-3, the feature value buffer 101-3 supplies the feature value only to the playback-position feature-value generator 102. The playback-position feature-value generator 102 sequentially obtains the most recent feature value and the feature values of the last three frames supplied from the feature value buffers 101-1 to 101-3, and combines these feature values to generate playback position information (playback-position feature values). The playback-position feature-value generator 102 outputs the playback position information to a comparator 103. That is, the playback-position feature-value generator 102 uses a total of four feature values including the most recent frame and the three previous frames as feature values for specifying the playback position, and generates playback-position feature values.

A search-position feature-value reader 104 sequentially reads a set of four consecutive feature values stored in the data recording medium 26, and supplies the set of four consecutive feature values as search-position feature values to the comparator 103 and a detector 105. The comparator 103 compares the playback-position feature values supplied from the playback-position feature-value generator 102 with the search-position feature values sequentially supplied from the search-position feature-value reader 104. When the comparator 103 finds the search-position feature values that match the playback-position feature values, the comparator 103 determines that synchronization is detected, and notifies the detector 105 of the detection of synchronization as a detection result. The detector 105 outputs the search-position feature values supplied from the search-position feature-value reader 104 as the synchronization detection result at a time when the comparator 103 determines that synchronization is detected.

Figure 11:
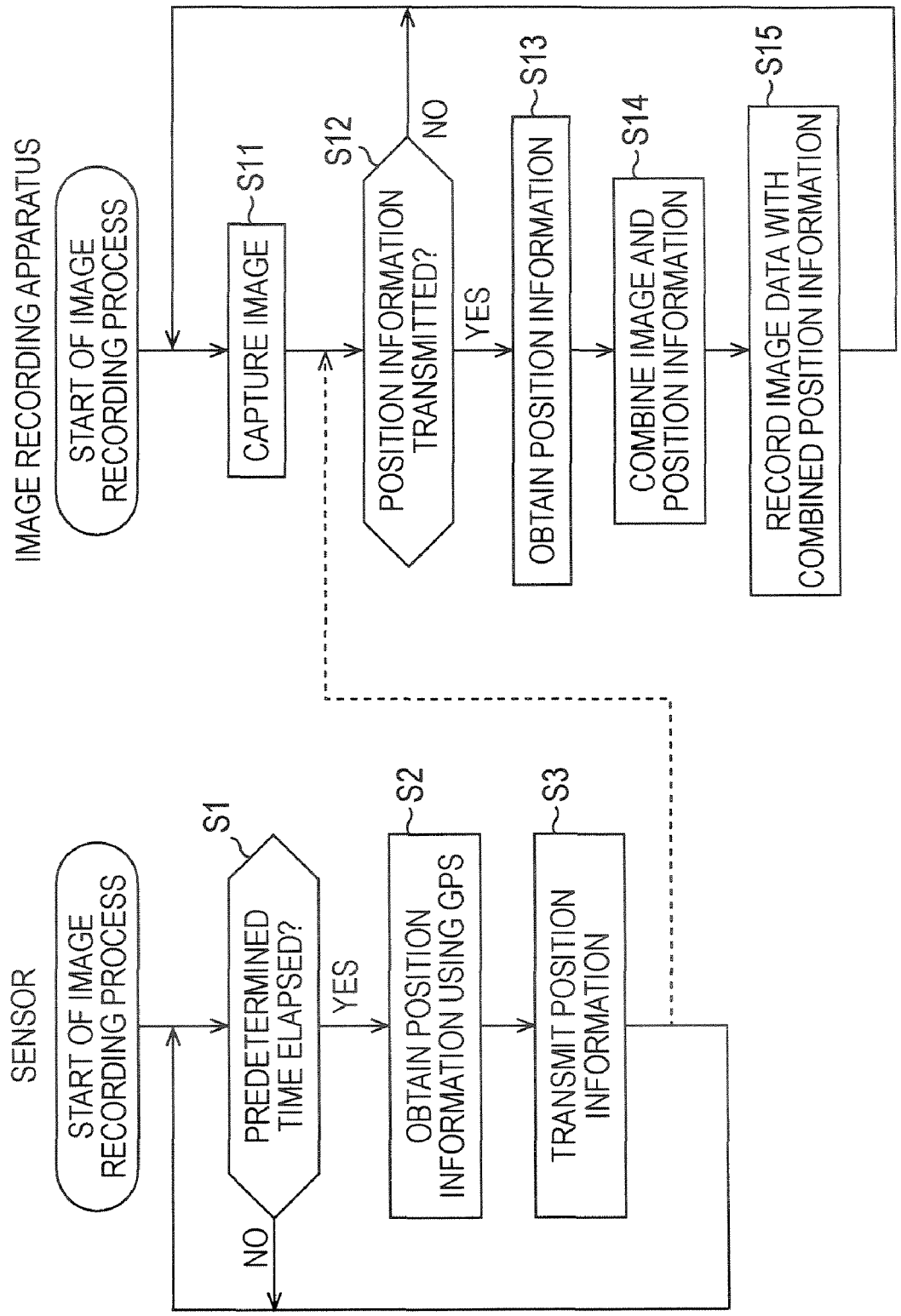
FIG. 11 is a flowchart showing an image recording process performed by the image recording apparatus shown in FIG. 3.

An image recording process performed by the image recording apparatus shown in FIG. 3 will be described with reference to a flowchart shown in FIG. 11.

In step S1, the GPS-position obtaining unit 31 of the sensor 11 determines whether or not a predetermined time has elapsed, and repeats the determination until the predetermined time has elapsed. For example, if it is determined in step S1 that the predetermined time has elapsed, in step S2, the GPS-position obtaining unit 31 receives radio waves emitted from geodetic satellites, calculates the latitude and longitude on the Earth to obtain position information, and supplies the position information to the transmitter 32.

In step S3, the transmitter 32 adds the ID 32a to the position information supplied from the GPS-position obtaining unit 31, and transmits the resulting position information. Then, the process returns to step S1.

In step S11, the image capturing unit 12 of the image recording apparatus captures a desired image, generates image data from the captured image, and supplies the image data to the combiner 14.

In step S12, the position-information obtaining unit 13 determines whether or not position information has been transmitted from the sensor 11. If position information has not been transmitted, the process returns to step S11. That is, images are continuously captured until position information has been transmitted. For example, if it is determined that position information has been transmitted from the sensor 11 according to the processing of step S3, in step S13, the position-information obtaining unit 13 obtains the position information including the ID 32a unique to the sensor 11 transmitted from the sensor 11, and supplies the obtained position information to the combiner 14. If a plurality of pieces of position information are transmitted from the plurality of sensors 11 at the same time, the position-information obtaining unit 13 obtains the plurality of pieces of position information at the same time, and supplies them to the combiner 14.

In step S14, the combiner 14 combines the position information including the ID 32a unique to the sensor 11 supplied from the position-information obtaining unit 13 with the image supplied from the image capturing unit 12, and supplies the result to the video recorder 15.

In step S15, the video recorder 15 sequentially records in the common medium 16 the image data with the combined position information supplied from the combiner 14. Then, the process returns to step S11.

With the process described above, when an image is captured, position information is combined at a time when the position information is supplied, and the common medium 16 having recorded therein the position information synchronized with the image data is generated.

An image modification process performed by the image processing apparatus shown in FIG. 4 will be described with reference to a flowchart shown in FIG. 12.

In step S21, the separator 22 determines whether or not a next image has been supplied from the playback unit 21, and repeats the determination until an image is supplied. For example, when the common medium 16 generated according to the above-described image recording process is played back by the playback unit 21 and image data including position information is supplied, in step S22, the separator 22 separates the position information from the image data, and supplies the image data to the modification processing device 23 and the position information to the modification-information determining unit 25.

In step S23, the modification-information determining unit 25 performs a modification-information determining process to generate modification information, and supplies the modification information to the modification processing device 23.

Figure 13:
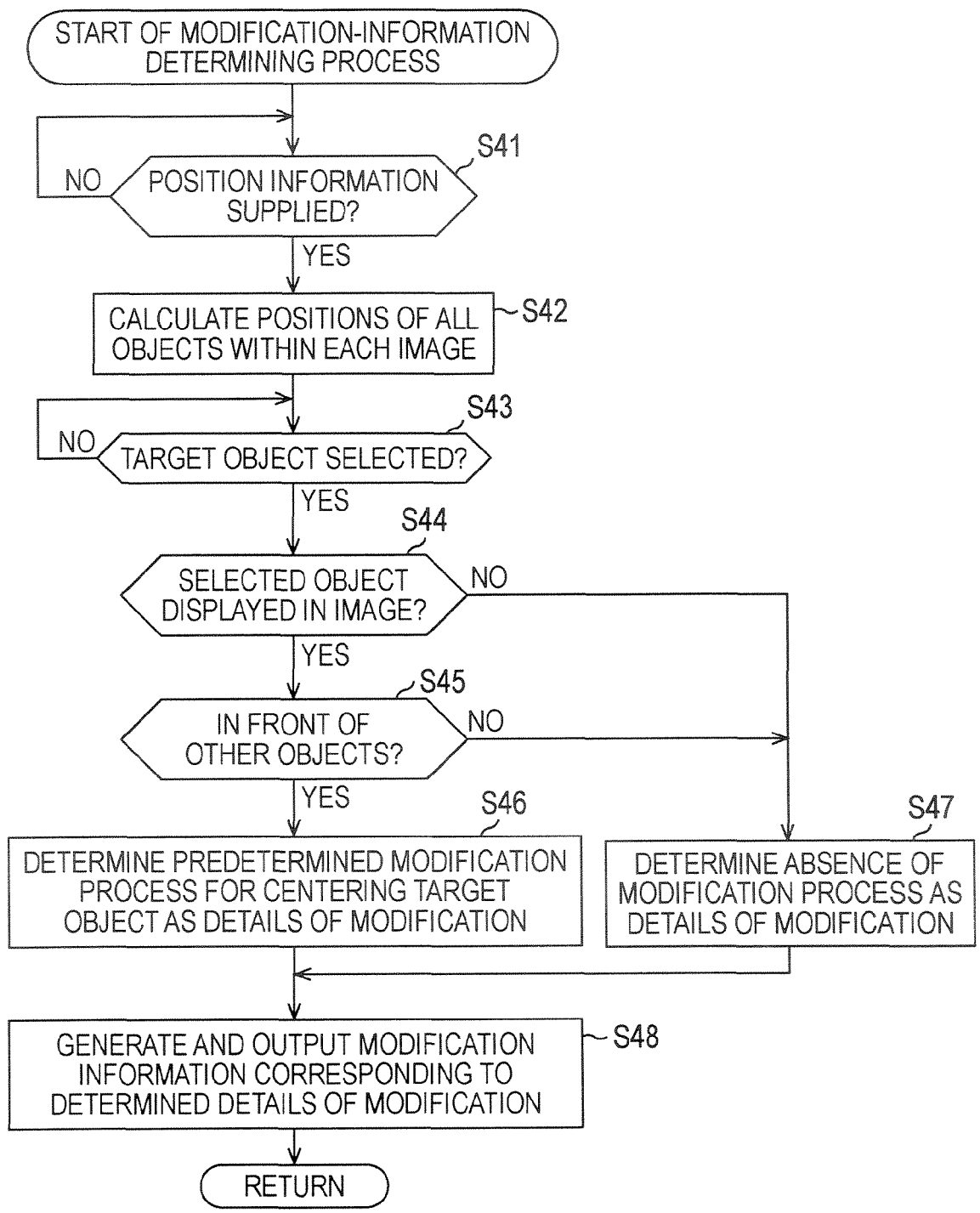
FIG. 13 is a flowchart showing a modification-information determining process in the image modification process shown in FIG. 12.

The modification-information determining process will be described with reference to a flowchart shown in FIG. 13.

In step S41, the position-information obtaining unit 41 determines whether or not position information has been supplied from the separator 22, and repeats the determination until position information is supplied. For example, when position information is supplied from the separator 22 according to the processing of step S22, in step S42, the position-information obtaining unit 41 obtains the supplied position information, and supplies it to the inter-image position calculating unit 42. The inter-image position calculating unit 42 calculates positions of the users serving as the objects in the image captured by the image capturing unit 12 on the basis of all the supplied pieces of position information, and supplies calculation results to the modification determiner 43 and the modification information generator 45.

Figure 14:
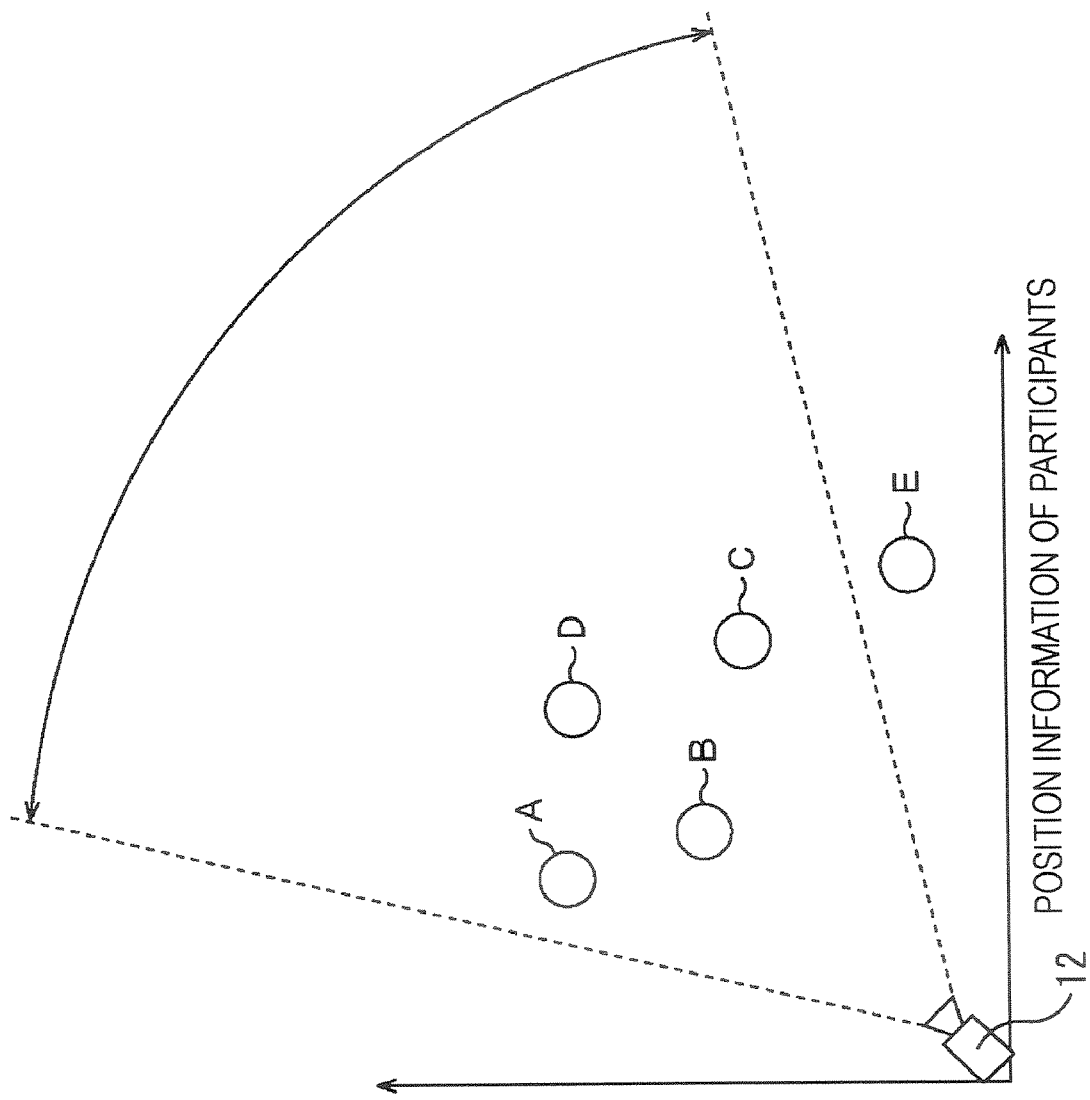
FIG. 14 is a diagram showing the modification-information determining process in the image modification process shown in FIG. 12.

The inter-image position calculating unit 42 performs a calculation based on position information of, for example, users A to E, and determines a positional relationship shown in FIG. 14. In FIG. 14, the shooting range of the image capturing unit 12 is illustrated in a two-dimensional plane as viewed from the top. That is, in FIG. 14, if the shooting range is represented by dotted lines, the users A to D are inside the shooting range of the image capturing unit 12, and the user E is outside the shooting range of the image capturing unit 12.

In step S43, the modification determiner 43 determines whether or not a user as a target object has been specified via the controller 24, and repeats the determination until a target user is specified. For example, the user specifies a target user by operating the controller 24, in step S44, the modification determiner 43 determines whether or not the user as the selected object is displayed in the image. In FIG. 14, if any of the users A to D inside the shooting range of the image capturing unit 12 is selected as a target object, it is determined that the object is displayed in the image. Then, the process proceeds to step S45.

In step S45, the modification determiner 43 determines whether or not the user as the selected object is in front of any other users as objects relative to the image capturing unit 12. In FIG. 14, if any of the users A to C is selected as a target object, there is no other users as objects between the image capturing unit 12 and the selected user, and the selected user is in front of any other object. Thus, the process proceeds to step S46.

In step S46, the modification determiner 43 notifies the modification-details determining unit 44 of a determination result indicating that a modification is allowed to be applied, and supplies the information of the user as the target object. The modification-details determining unit 44 determines a modification process for positioning the user as the target object at the center of the image as the details of a modification, and supplies the determination result to the modification information generator 45. For example, in FIG. 14, if the user A is selected as the target, the modification-details determining unit 44 supplies as the details of a modification to the modification information generator 45 a modification process for modifying the image to produce a zoomed image centered on the selected user A.

In step S48, the modification information generator 45 generates modification information for giving a specific modification instruction to the modification processing device 23 on the basis of the information of the details of the modification from the modification-details determining unit 44, and supplies the modification information to the modification processing device 23. For example, if a modification process for modifying the image to produce a image zoomed at a predetermined magnification to center on the selected user A is specified, the modification information generator 45 determines a pixel position corresponding to the center of the image from the position information of the user A according to the calculation result of the inter-image position calculating unit 42, and determines a magnification at which an image centered on the user A is magnified around the determined pixel position. The modification information generator 45 generates modification information including the determined center pixel position and magnification information, on the basis of which the zoomed image in the image is generated, and supplies the modification information to the modification processing device 23.

For example, if the user E shown in FIG. 14 is selected as a target object, it is determined in step S44 that the selected object is not displayed in the image, and the process proceeds to step S47. For example, if the user D shown in FIG. 14 is selected as a target object, it is determined in step S45 that the user D is not in front of any other objects because the user B is located between the user D and the image capturing unit 12, and the process proceeds to step S47.

In step S47, the modification determiner 43 notifies the modification-details determining unit 44 of a determination result indicating that a modification is not allowed to be applied, and supplies the information of the user as the target object. The modification-details determining unit 44 supplies the information of the user D or E as the target object and the absence of a modification process as the details of a modification to the modification information generator 45.

As a result, in step S48, the modification information generator 45 generates modification information indicating the absence of a modification process, and supplies the modification information to the modification processing device 23.

With the process described above, it is determined whether or not a modification is allowed to be applied on the basis of whether or not a modification-target object is located in an image captured by the image capturing unit 12, and if a modification is allowed to be applied, modification information necessary for the modification processing device 23 to perform a modification process is generated. In the foregoing description, a target object is selected by the user. If the user does not specify a target object, the modification-information determining process may be repeatedly performed sequentially on all objects, and modification information may be individually determined for all the objects. Although the details of a modification have been described in the context of a modification for producing a zoomed image centered on a target object, any other modifications may be performed. For example, when the user specifies a target object, the user may also specify the details of a modification for the object. In the foregoing description, it is determined whether or not a user is included in an image using a two-dimensional layout of objects as viewed from the top in FIG. 14. Instead of using the two-dimensional layout, a three-dimensional layout of objects may be used to determine whether or not a user as a target object is located in an image on the basis of the position information.

Figure 12:
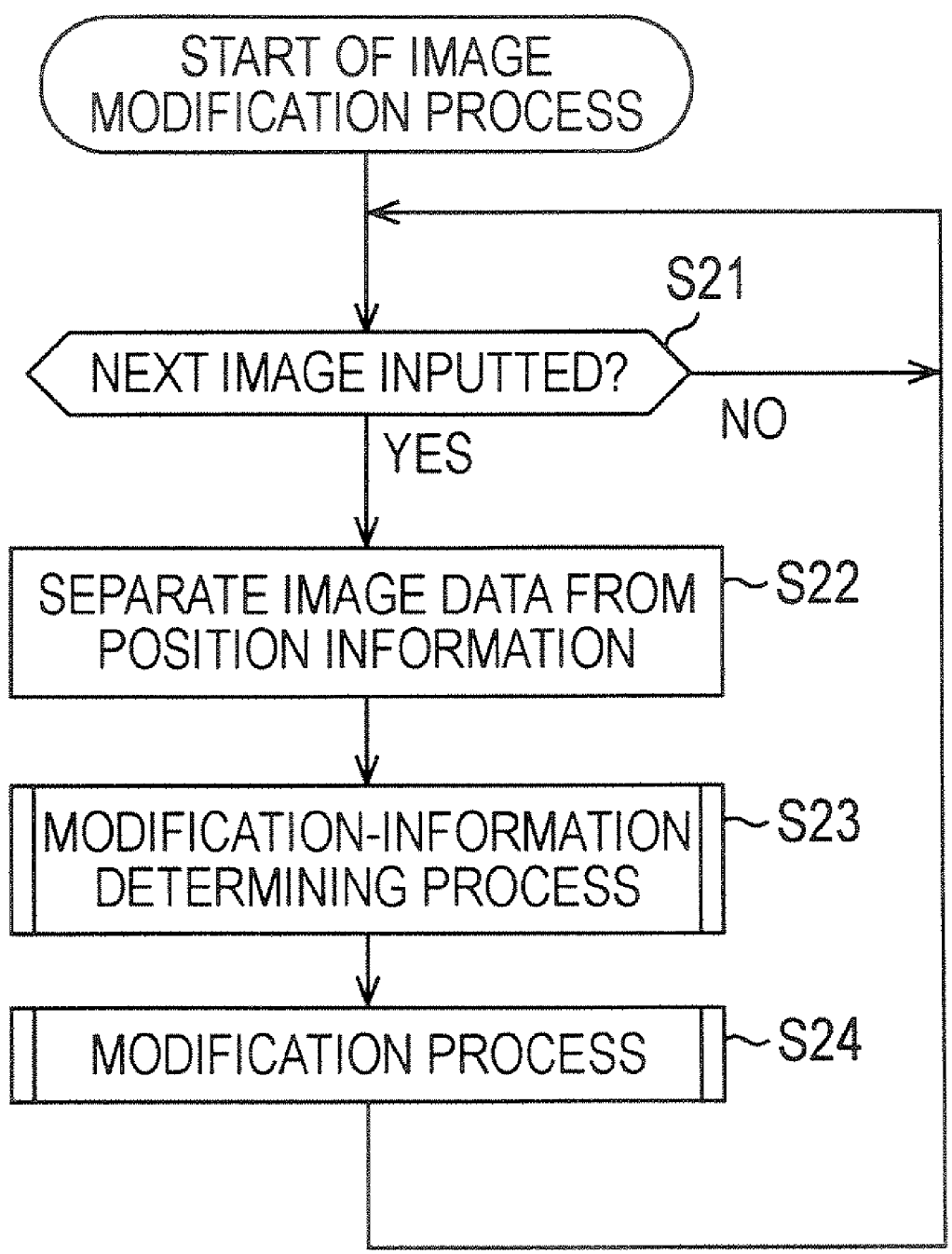
FIG. 12 is a flowchart showing an image modification process performed by the modification processing device shown in FIG. 7.

The description returns to the flowchart of FIG. 12.

In step S24, the modification processing device 23 applies a modification process to the image supplied from the separator 22 on the basis of the modification information supplied from the modification-information determining unit 25. Further, the modification processing device 23 records setting information necessary for the modification process in the data recording medium 26, and displays the processed image on the display unit 70.

The modification process performed by the modification processing device 23 shown in FIG. 7 will be described with reference to a flowchart shown in FIG. 15.

In step S61, the delay unit 66 temporarily stores the supplied image to delay the image of one frame period. In the following description, the image is processed on a frame-by-frame basis. However, it is to be anticipated that the image may be processed, for example, on a field-by-field basis instead of a frame-by-frame basis.

In step S62, the feature value extractor 61 performs a feature-value extracting process to extract a feature value of an image of one frame supplied from the separator 22. That is, when the delay unit 66 temporarily stores a new image to delay the image for one frame period, the image of one frame is also supplied to the feature value extractor 61, and the same image is subjected to two operations at the same time. That is, the image is temporarily stored for delay while a feature value is extracted from the image.

Figure 16:
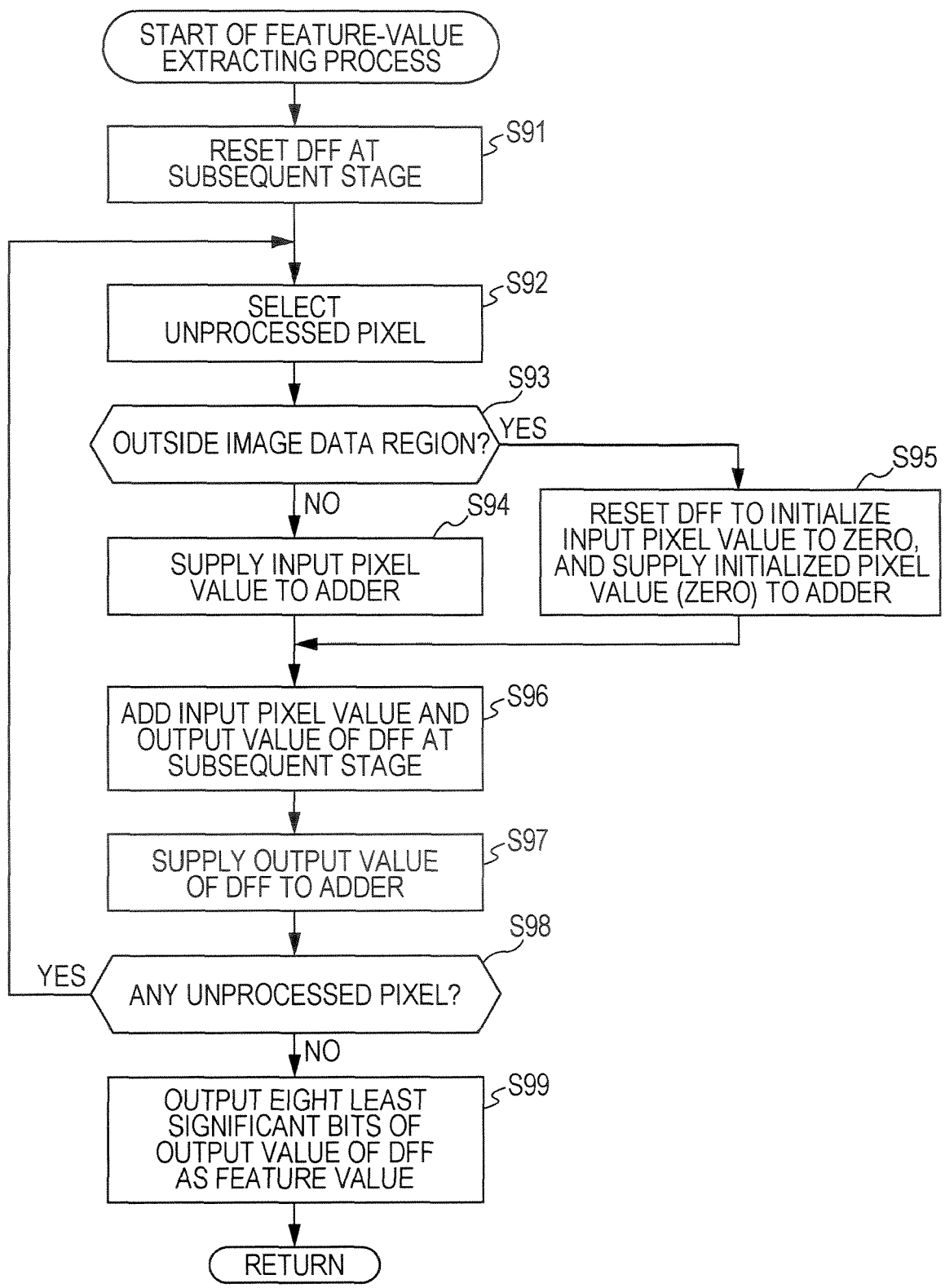
FIG. 16 is a flowchart showing a feature-value extracting process in the modification process shown in FIG. 15.

The feature-value extracting process will be described with reference to a flowchart shown in FIG. 16.

In step S91, the DFF 83 is reset due to the frame start point S (FIG. 9).

In step S92, an unprocessed pixel is selected. In step S93, it is determined whether or not the pixel is outside the image data region. More specifically, for example, unprocessed pixels of an image of one frame are sequentially read in a raster scan order, and it is determined whether or not each of the unprocessed pixels is outside the image data region.

As shown in FIG. 9, the first pixel (pixel at the frame start point S) is included in synchronization data, and is thus outside the image data region. In step S95, the DFF 81 is reset, and the DFF 81 outputs zero as a pixel value. When a pixel to be processed is selected in the raster scan order and is within the image data region, on the other hand, in step S94, the DFF 81 supplies the pixel value of that pixel to the adder 82 in accordance with the generation timing of a clock signal.

In step S96, the adder 82 adds the input pixel value and a signal supplied from the DFF 83, and supplies the sum to the DFF 83.

In step S97, the DFF 83 returns the eight least significant bits of the sum supplied from the adder 82 in accordance with the generation timing of a clock signal. In this case, although the DFF 83 also outputs the sum to the output unit 84, the output unit 84 does not output the sum.

In step S98, it is determined whether or not there is any other unprocessed pixel. If there is any other unprocessed pixel, the process returns to step S92. That is, the processing of steps S92 to S98 is repeated until all the pixels for one frame have been processed. If it is determined that all the pixels for one frame have been processed, in step S99, the output unit 84 outputs the sum supplied from the DFF 83, namely, the eight least significant bits of the accumulative sum of pixel values contained in the image data region, as a feature value of the image of that frame.

With the process described above, the eight least significant bits of the accumulative sum of all the pixel values within the image data region are extracted from the image signal for one frame as the feature value of that frame.

Figure 15:
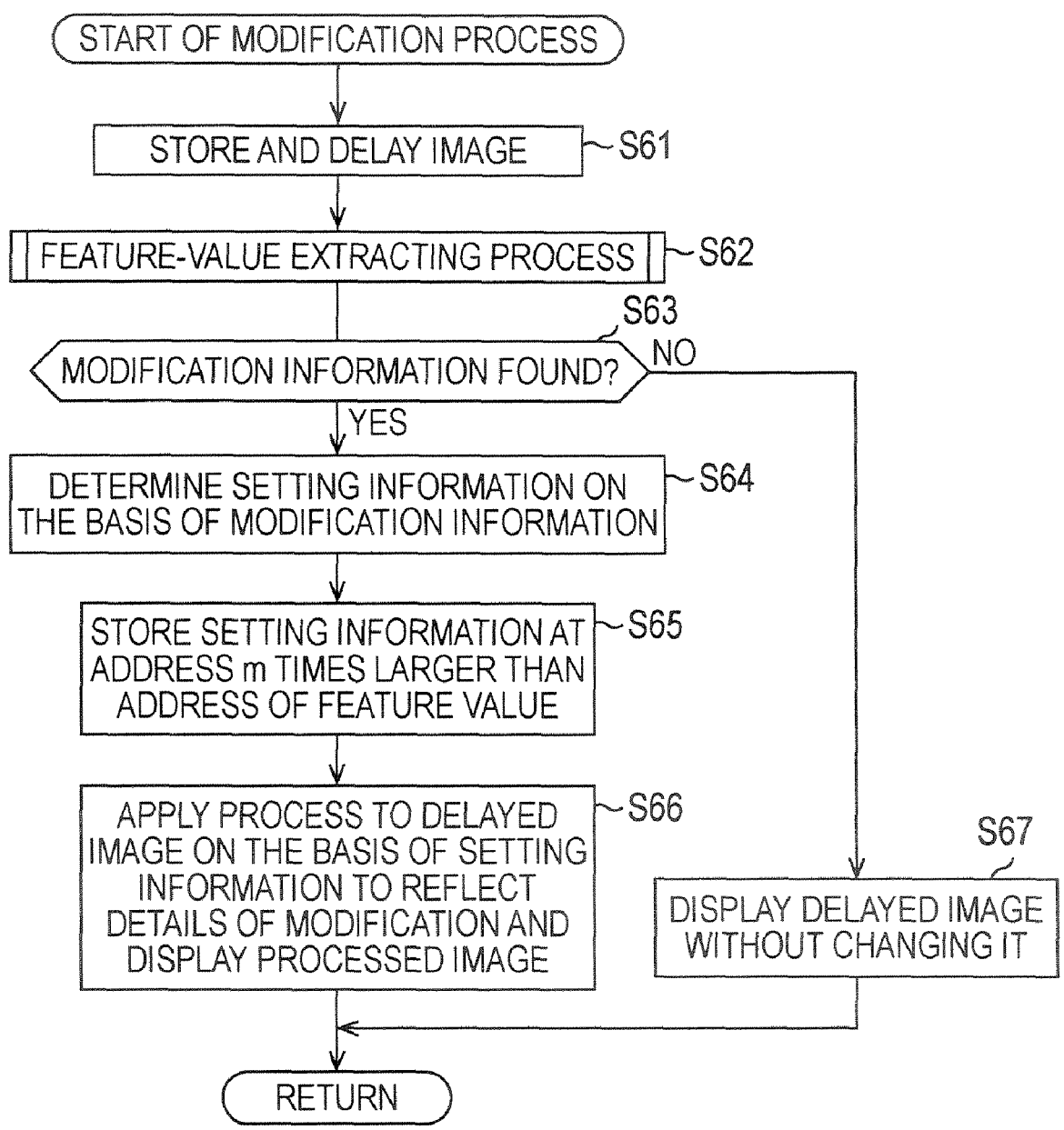
FIG. 15 is a flowchart showing a modification process performed by the modification processing device shown in FIG. 7.

The description returns to the flowchart of FIG. 15.

In step S63, the modification-information recognizer 68 determines whether or not the modification information supplied from the modification-information determining unit 25 indicates the presence of a modification process. For example, if the modification information indicates the absence of a modification process according to the processing of steps S47 and S48 shown in FIG. 13 or if modification information itself does not exist, it is determined that no modification process is to be performed. If the modification information is designated so as to correspond to a desired modification according to the processing of steps S46 and S48, it is determined that modification information is found.

If it is determined in step S63 that modification information is found, in step S64, the modification-information recognizer 68 recognizes the modification information, and supplies it to the setting-information determining unit 69. The setting-information determining unit 69 determines setting information for the reflecting unit 67 to process the image on the basis of the modification information, and supplies the setting information to the feature-value setting-information recorder 63 and the selector 65. For example, the setting-information determining unit 69 determines setting information on the basis of modification information including the center pixel position and magnification information, on the basis of which a zoomed image in the image is generated, and supplies the setting information to the feature-value setting-information recorder 63 and the selector 65.

Figure 17:
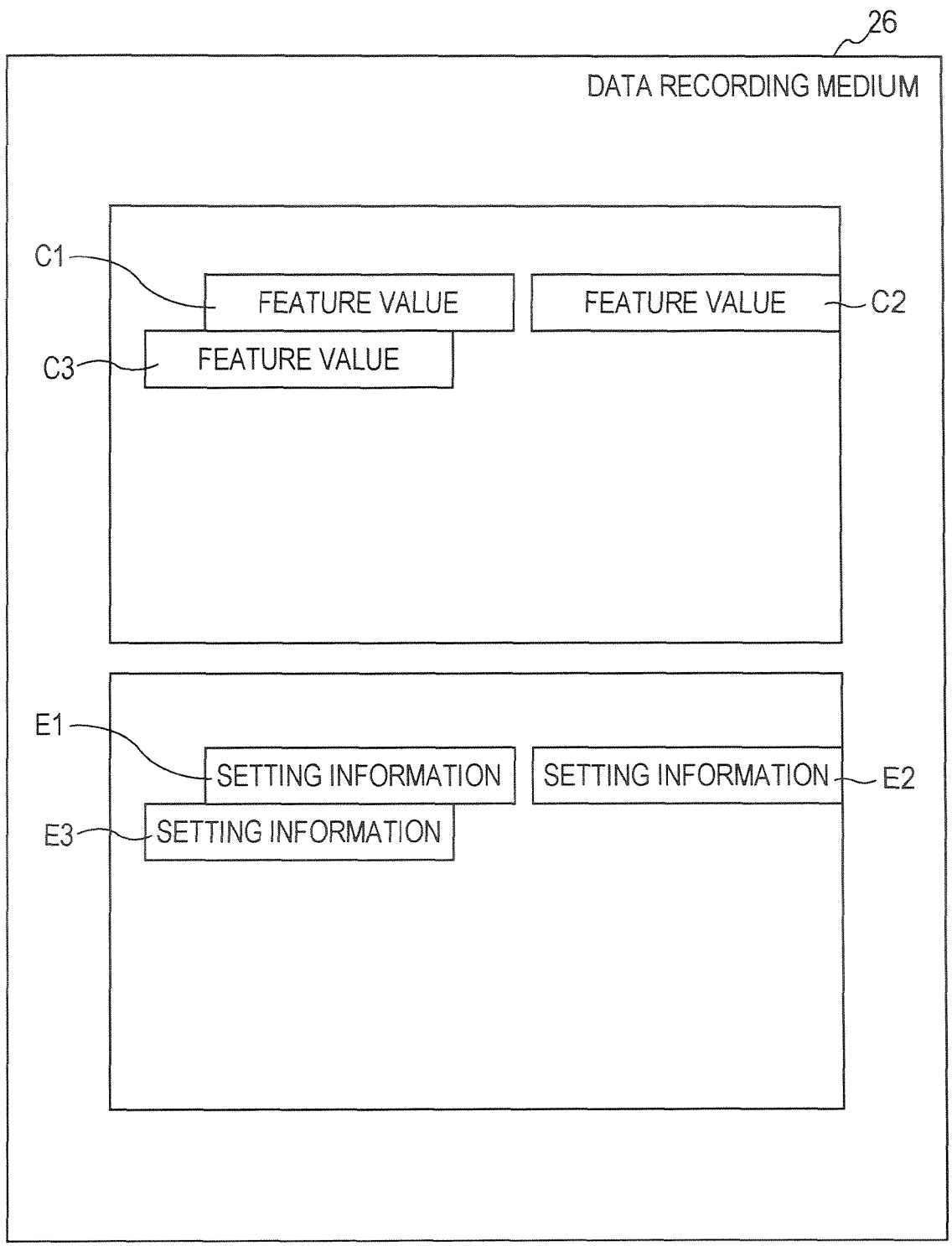
FIG. 17 is a diagram showing the feature-value extracting process in the modification process shown in FIG. 15.

In step S65, the feature-value setting-information recorder 63 records in the data recording medium 26 the feature value supplied from the feature value extractor 61, and also records in the data recording medium 26 the setting information supplied from the setting-information determining unit 69 in association with the feature value, thereby storing the feature value and the setting information. More specifically, as shown in FIG. 17, when a feature value C1 is recorded at a predetermined address A, setting information E1 associated with the feature value C1 is stored at an address m times larger than the address A, i.e., an address m×A. In FIG. 17, the allocation of addresses at which feature values and setting information are stored in the data recording medium 26 are illustrated.

Likewise, the feature-value setting-information recorder 63 stores a feature value C2 at an address B and setting information E2 associated with the feature value C2 at an address m×B, and stores a feature value C3 at an address C and setting information E3 associated with the feature value C3 at an address m×C. In this manner, a piece of setting information is stored in association with a feature value, whereby once a feature value is determined, the address of the corresponding piece of setting information can be specified from the address of the feature value. Therefore, a piece of setting information corresponding to each of the feature values stored in the data recording medium 26 can be smoothly searched for. Feature values and pieces of setting information are continuously recorded for a period during which the same process is continuously specified. That is, for example, each of the feature values C1 to C3 shown in FIG. 17 is not limited to a feature value for one frame, but feature values for frames corresponding to a period during which the same process is continuously specified are continuously recorded. The same applies to the setting information. For example, each of the pieces of setting information E1 to E3 shown in FIG. 17 is not limited to that for one frame on the basis of the addresses associated with the feature values C1 to C3, and pieces of setting information for frames corresponding to a period during which the same process is continuously specified are continuously recorded.

In step S66, since setting information is supplied from the setting-information determining unit 69, the selector 65 supplies the setting information supplied from the setting-information determining unit 69 to the reflecting unit 67. The reflecting unit 67 applies a process to the image stored in the delay unit 66 on the basis of the setting information supplied from the selector 65 so that the process specified by the user is reflected in the image, and displays the processed image on the display unit 70.

That is, the user performs the processing of steps S61 to S66 on the basis of modification information to thereby store feature values in the data recording medium 26 and also store setting information involved with the modification information in association with the feature values. The processing of steps S61 to S66 corresponds to the operation in the recording mode described above with reference to FIGS. 1A and 2.

If it is determined in step S63 that no modification process is found, in step S67, the feature-value setting-information reader 64 does not supply setting information to the selector 65. Thus, the selector 65 is not supplied with setting information from either the setting-information determining unit 69 or the feature-value setting-information reader 64, and does not supply setting information for designating a process to the reflecting unit 67. Therefore, the reflecting unit 67 displays the image of one frame temporarily stored in the delay unit 66 on the display unit 70 without changing the image.

The description returns to the flowchart of FIG. 12.

After the modification process in step S24 has completed, the process returns to step S21, a modification process is applied to the image on a frame-by-frame basis sequentially, and setting information necessary for the modification process is recorded in the data recording medium 26.

With the process described above, if a user as a target object is located in an image and is in front of any other objects on the basis of image data including position information recorded in the common medium 16, a modification process for positioning the user at the center is applied, and setting information necessary for the modification process is recorded in the data recording medium 26 in association with the feature value.

A playback process performed by the image processing apparatus shown in FIG. 4 will be described with reference to a flowchart shown in FIG. 18.

In step S101, the separator 22 determines whether or not a next image has been supplied by the playback unit 21, and repeats the determination until an image is supplied. For example, when the common medium 16 generated according to the above-described image recording process is played back by the playback unit 21 and image data including position information is supplied, in step S102, the separator 22 separates the position information from the image data, and supplies the image data to the modification processing device 23 and the position information to the modification-information determining unit 25.

In step S103, the delay unit 66 temporarily stores the supplied image to delay the image for one frame period. In step S104, the feature value extractor 61 of the modification processing device 23 performs a feature-value extracting process to extract a feature value of an image of one frame supplied from the separator 22. The feature-value extracting process is similar to the feature-value extracting process described above with reference to the flowchart of FIG. 16, and a description thereof is thus omitted.

In step S105, the synchronization detector 62 performs a synchronization detecting process to detect synchronization between the feature value of the currently played back image and the feature value associated with the setting information for applying the process to the image.

Figure 19:
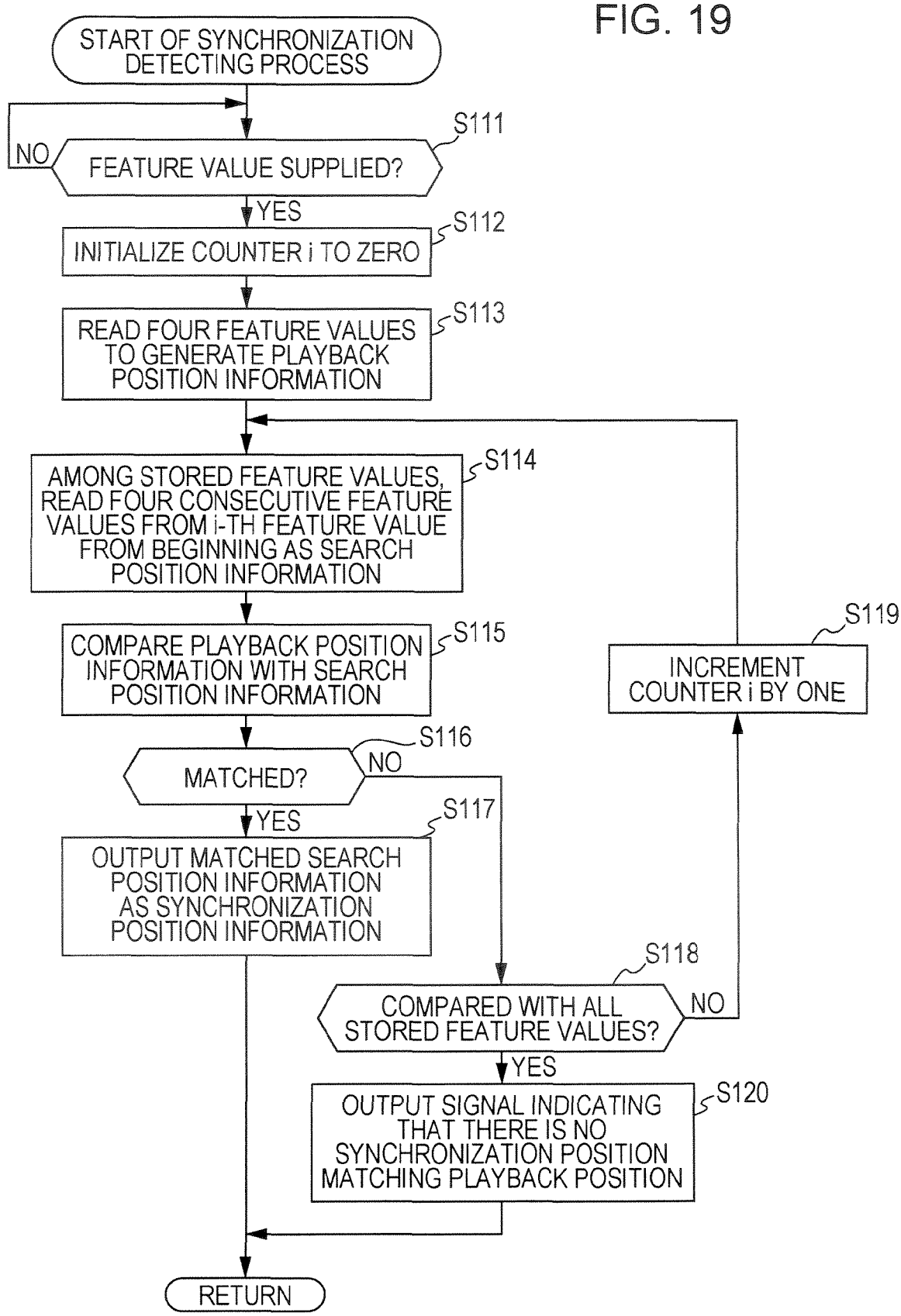
FIG. 19 is a flowchart showing a synchronization detecting process in the playback process shown in FIG. 18.

The synchronization detecting process will be described with reference to a flowchart shown in FIG. 19.

In step S111, the playback-position feature-value generator 102 of the synchronization detector 62 determines whether or not a feature value is supplied from the feature value extractor 61, and repeats the determination until a feature value is supplied. For example, when a feature value is extracted according to the feature-value extracting process performed in step S104 and the feature value of the image being currently played back is supplied from the feature value extractor 61, the process proceeds to step S112.

In step S112, the search-position feature-value reader 104 initializes a counter i for counting search-position feature values.

In step S113, the playback-position feature-value generator 102 obtains the supplied feature value and the feature values that have been already stored in the feature value buffers 101-1 to 101-3. That is, when a new feature value is supplied to the feature value buffer 101-1, the feature value buffer 101-1 supplies the feature value that has been already stored therein to the playback-position feature-value generator 102 and the feature value buffer 101-2. The feature value buffer 101-2 stores the supplied feature value, and supplies the feature value that has been already stored therein to the playback-position feature-value generator 102 and the feature value buffer 101-3. The feature value buffer 101-3 stores the feature value supplied from the feature value buffer 101-2, and supplies the feature value that has been already stored therein to the playback-position feature-value generator 102. As a result, the feature value of the most recent frame and the feature values of the last three frames stored in the feature value buffers 101-1 to 101-3 are supplied to the playback-position feature-value generator 102. The playback-position feature-value generator 102 supplies the feature values of the four frames including the frame being currently played back as playback-position feature values to the comparator 103.

In step S114, the search-position feature-value reader 104 reads, as search-position feature values, feature values of four consecutive frames starting from the i-th frame from the beginning of the feature values stored in the data recording medium 26, and supplies the search-position feature values to the comparator 103 and the detector 105.

In step S115, the comparator 103 compares the playback-position feature values including a total of four feature values of the frame being currently played back and the last three frames, which are supplied from the playback-position feature-value generator 102, with the search-position feature values including the feature values of the four consecutive frames starting from the i-th frame from the beginning of the feature values stored in the data recording medium 26, which are supplied from the search-position feature-value reader 104.

In step S116, the comparator 103 determines whether or not the playback-position feature values match the search-position feature values on the basis of a comparison result. If it is determined in step S116 that no matching is found, in step S118, the search-position feature-value reader 104 determines whether or not the playback-position feature values have been compared with all the feature values stored in the data recording medium 26. If it is determined in step S118 that the playback-position feature values have not been compared with all the feature values in the data recording medium 26, in step S119, the search-position feature-value reader 104 increments the counter i by one, and the process returns to step S114. Therefore, the processing of steps S114 to S116, S118, and S119 is repeated unless the playback-position feature values match the search-position feature values and until the playback-position feature values have been compared with all the stored feature values. The comparison between the feature values of four consecutive frames and the playback-position feature values is repeated with shifts of one-frame intervals.

Figure 20:
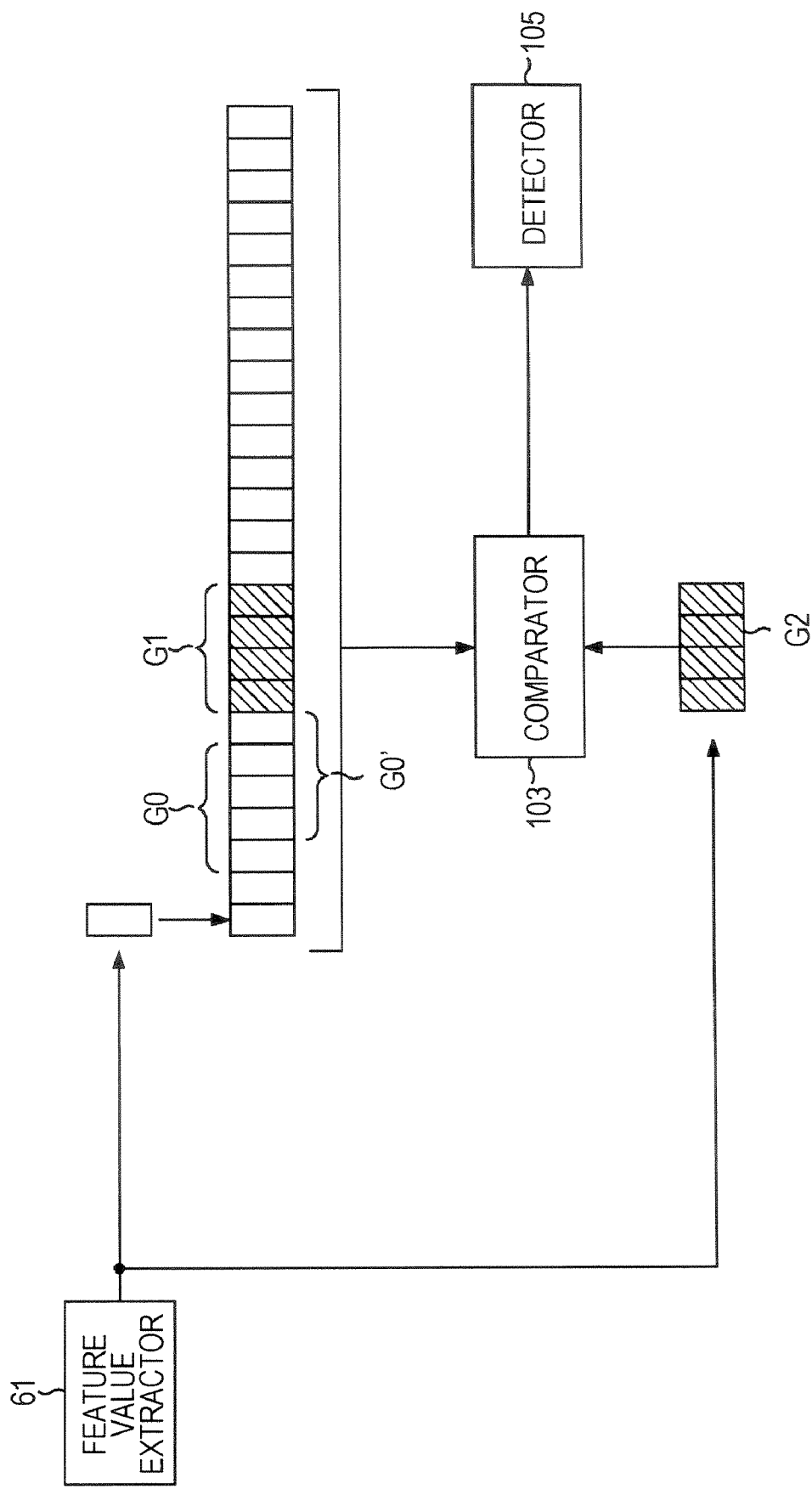
FIG. 20 is a diagram showing the synchronization detecting process in the playback process shown in FIG. 18.

As shown in the upper right portion of FIG. 20, the search-position feature values are a group of four consecutive feature values from among the feature values sequentially stored by the feature value extractor 61. In FIG. 20, a vertically long rectangular block represents a feature value for one frame. Feature value groups G1 and G2, which are shaded, indicate that the consecutive feature values in the groups G1 and G2 match each other. As shown in the lower right portion of FIG. 20, the playback-position feature values are a group of feature values of four consecutive frames including a feature value of a frame being currently played back, which are supplied from the feature value extractor 61.

For example, as shown in FIG. 20, when the playback-position feature value group G2 is compared with a search-position feature value group G0, the playback-position feature value group G2 does not match the search-position feature value group G0, and no synchronization position is detected. Since the playback-position feature value group G2 has not been compared with all the stored feature values, the counter i is incremented by one, and the playback-position feature value group G2 is compared with a search-position feature value group G0'. In this manner, the search-position feature value groups are repeatedly compared with the playback-position feature value group G2 while shifting the search-position feature values to the right in FIG. 20 one-frame-by-one-frame.

In step S116, for example, the playback-position feature value group G2 is compared with the search-position feature value group G1. In this case, the search-position feature value group G1 and the playback-position feature value group G2 have the same structure, and therefore it is determined that the search-position feature value group G1 and the playback-position feature value group G2 match each other. In step S117, the comparator 103 notifies the detector 105 of a matching. In response to the notification, the detector 105 supplies the beginning of the search-position feature values currently supplied from the search-position feature-value reader 104, that is, the i-th feature value from the beginning, as synchronization position information to the feature-value setting-information reader 64.

If it is determined in step S118 that the playback-position feature values have been compared with all the stored search-position feature values, in step S120, the detector 105 outputs a detection result indicating that there are no search-position feature values matching the playback-position feature values and hence there is no synchronization.

With the process described above, the feature value of the image being currently played back can be synchronized with the feature value stored in the data recording medium 26. That is, in order to reduce the possibility of detecting synchronization at an incorrect position due to accidental matching of only the feature value of the frame being currently played back with one of the feature values stored in the data recording medium 26, four frames including the frame being currently played back and the last three frames, instead of only the feature value of the frame being currently played back, are compared with the feature values stored in the data recording medium 26. Accordingly, the synchronization detector 62 can perform more accurate synchronization detection. Since the feature values are used in this way, the feature values can be designated instead of the time codes in units of frames, and synchronization can be detected on a frame-by-frame basis without using the time codes.

Figure 18:
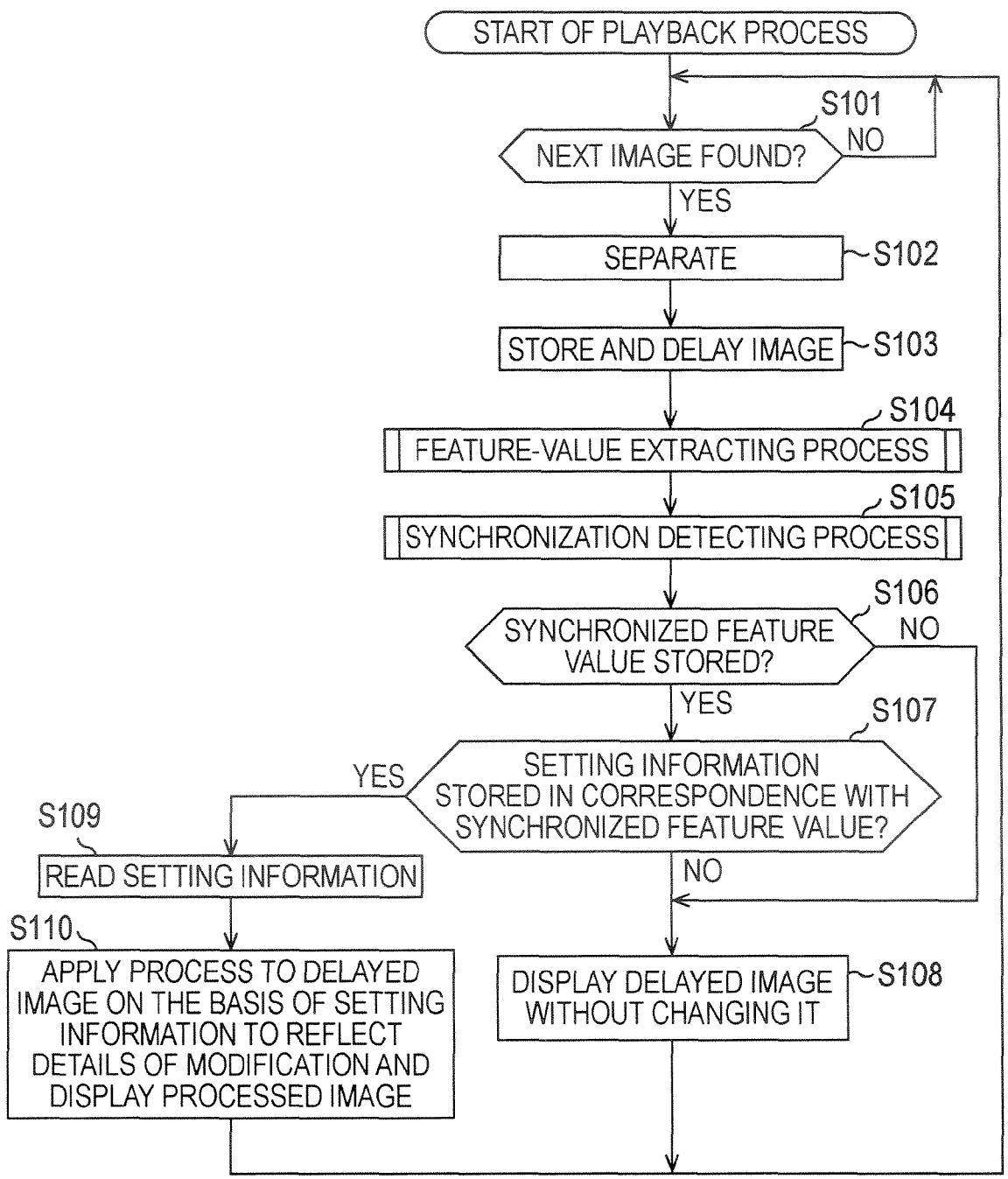
FIG. 18 is a flowchart showing a playback process performed by the image processing apparatus shown in FIG. 4.

The description returns to the flowchart of FIG. 18.

In step S106, the feature-value setting-information reader 64 determines whether or not a feature value matching the playback-position feature value of the currently played back frame has been stored in the data recording medium 26. For example, when synchronization position information is supplied according to the processing of step S117 in the flowchart of FIG. 19, a feature value matching the playback-position feature value of the currently played back frame has been stored in the data recording medium 26, and the process proceeds to step S107.

In step S107, the feature-value setting-information reader 64 determines whether or not the setting information associated with the synchronized feature value has been stored in the data recording medium 26. Since a feature value can be stored in the data recording medium 26 even if there is no setting information associated with the feature value, this processing can determine whether or not there is setting information associated with the feature values.

If it is determined in step S107 that the setting information associated with the feature values has not been stored, in step S108, the feature-value setting-information reader 64 does not supply setting information to the selector 65. Thus, the selector 65 is not supplied with setting information from either the setting-information determining unit 69 or the feature-value setting-information reader 64, and does not supply setting information for giving a process instruction to the reflecting unit 67. Therefore, the reflecting unit 67 displays the image of one frame temporarily stored in the delay unit 66 on the display unit 70 without changing the image.

If it is determined in step S107 that the setting information associated with the feature values has been stored, in step S109, the feature-value setting-information reader 64 reads the setting information stored in association with the feature value of the synchronization position information from the data recording medium 26, and supplies the read setting information to the selector 65. Then, the process proceeds to step S110.

In step S110, since the selector 65 is not supplied with setting information from the setting-information determining unit 69 but is supplied from setting information from the feature-value setting-information reader 64, the setting information from the feature-value setting-information reader 64 is supplied to the reflecting unit 67. The process is reflected in the image of one frame stored in the delay unit 66 on the basis of the setting information, and the processed image is displayed on the display unit 70.

With the process described above, an image modification process is performed to modify an image recorded in the common medium 16 on the basis of the setting information recorded in the data recording medium 26 in association with the feature value, and the modified image is displayed.

The playback process shown in FIG. 18 corresponds to the operation in the playback mode described above with reference to FIGS. 1A and 2.

With the process described above, when an image is captured by the image capturing unit 12, if users serving as objects have the sensors 11, image data including position information of each of the sensors 11 is recorded in the common medium 16. While the image is being played back on the basis of the image data recorded in the common medium 16, the above-described image modification process is performed on the basis of the position information included in the image to store setting information for modifying the image for each of the users having the sensors 11 in the data recording medium 26 in association with the feature value of the image. When the image data recorded in the common medium 16 is played back, the played back image can be played back as an image modified on the basis of the setting information recorded in the data recording medium 26 in association with the feature value of the image.

Thus, for example, when a zoom process for zooming into a modification-target user is performed as a modification process, each time an image recorded in the common medium 16 is played back, the image can be played back so as to constantly zoom into the user as long as the modification-target user is included in the image. The image can therefore be played back in a manner in which the image capturing unit 12 captures the image while following only the modification-target user.

Since a modification is not directly applied to an image recorded in the common medium 16, even if the image recorded in the common medium 16 is an image that is no longer allowed to be copied, such as a "copy once" image, the image can be played back as an image whose focus is the modification-target user. Also for the other users having the sensors 11, by changing the setting information recorded in the data recording medium 26, the image can be modified for the individual users, and the modified images can be repeatedly played back.

Furthermore, before an image to be recorded in the common medium 16 together with position information is captured, only the sensors 11 can be distributed to a plurality of users in advance, and after the image has been captured, the data recording medium 26 in which setting information is recorded by an image modification process can be generated. A combination of the common medium 16 and the data recording medium 26 in which the setting information is recorded in association with the feature values of the image recorded in the common medium 16 can be sold for each modification-target user, thus increasing the possibility of driving the users to buy such a combination of media compared with the sale of media in which only an image captured by the single image capturing unit 12 is recorded, resulting in contribution to more vigorous economic activity.

While the feature value has been described in the context of an accumulated value of pixel values in an image data region within an image signal of one frame, any other feature value may be used. For example, a motion vector (a motion relative to the entire screen and a local motion), a value indicating how often a specific waveform pattern appears, an accumulated value of pixel values in a size-reduced image, an accumulated value of pixel values of a specific part of the image, a value using those for a plurality of frames, or a combination of those feature values may be used.

While the setting information has been described in the context of the zoom magnification, any other information may be used. For example, a zoom parameter such as the zoom position (center position) or a combination of the zoom position and the zoom magnification, the brightness, the contrast, the gamma correction, an image-quality setting parameter such as Digital Reality Creation (DRC) palette value (including a resolution setting value and a noise setting value), or an audio parameter such as audio volume or audio switching (switching of language used) may be used.

Figure 4:
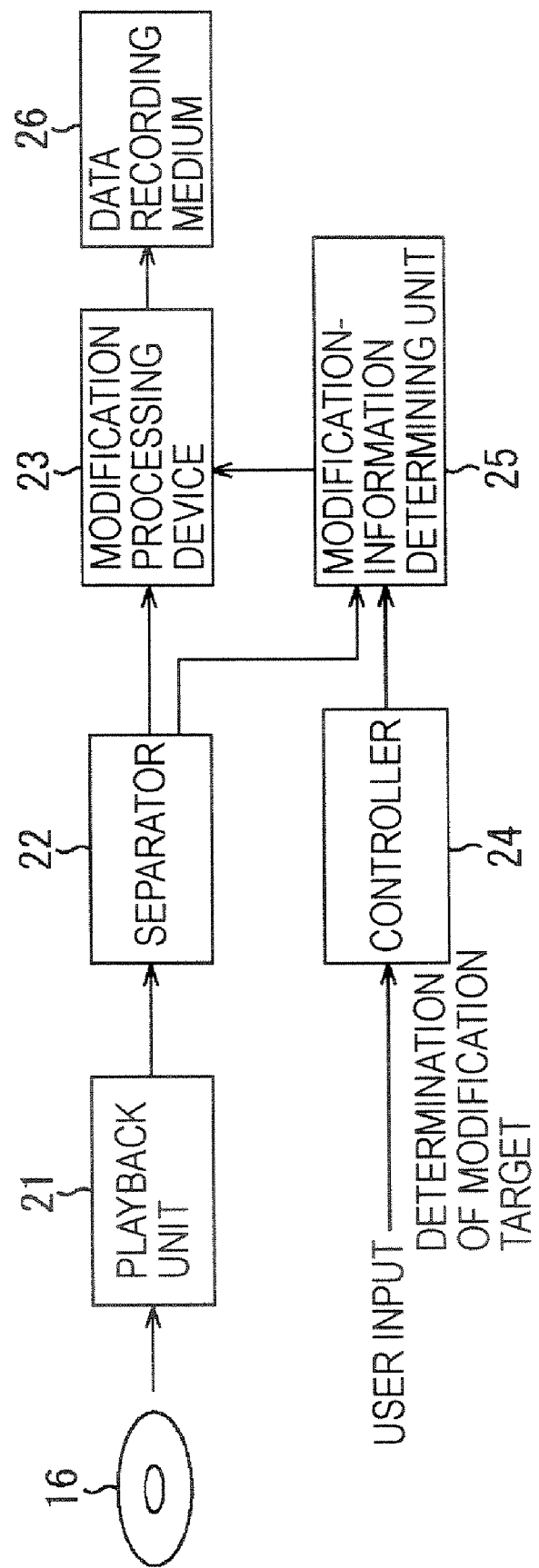
FIG. 4 is a block diagram showing the structure of the image processing apparatus according to the embodiment of the present invention.

Further, it can be said that the image recording apparatus shown in FIG. 3 and the image processing apparatus shown in FIG. 4 constitute an image processing system with the intervention of the common medium 16.

In the foregoing description, it is determined whether or not a process is applied to an image on the basis of whether or not a user as a specific object is included in the image according to position information. This can mean that the process to be applied to the image is designated on the basis of the state of the user as the specific object. Therefore, any image process that is based on the status information of the object, including but not limited to a process for determining the details of a process to be applied to the image on the basis of whether or not the object is included in the image according to the position information of the object, may be used. For example, status information indicating whether or not a user as a specific object directs the face to the image capturing unit 12 may be determined, and if the face is directed to the image capturing unit 12, a zoom process may be performed. Alternatively, status information, such as temperature information, of a user as a specific object may be determined using a thermo sensor or the like, and the zoom magnification may be changed according to the determined temperature information to perform an image processing operation. That is, the image processing operation may be performed according to the status information of the object.

In the foregoing description, the common medium 16 is generated in a state where the position information obtained by the position-information obtaining unit 13 is combined with the image captured by the image capturing unit 12 according to an image recording process, by way of example. Since the image data of the image recorded in the common medium 16 has the position information combined therewith, only a playback apparatus having a function for separating the image data from the position information, such as the separator 22, can play back the image data. Therefore, only the image captured by the image capturing unit 12 may be recorded in the common medium 16, and the position information may be recorded in a different position-information recording medium. In this case, in order to synchronize a playback position on the image with the position information, the position information may be recorded in association with a feature value of the image.

Figure 21:
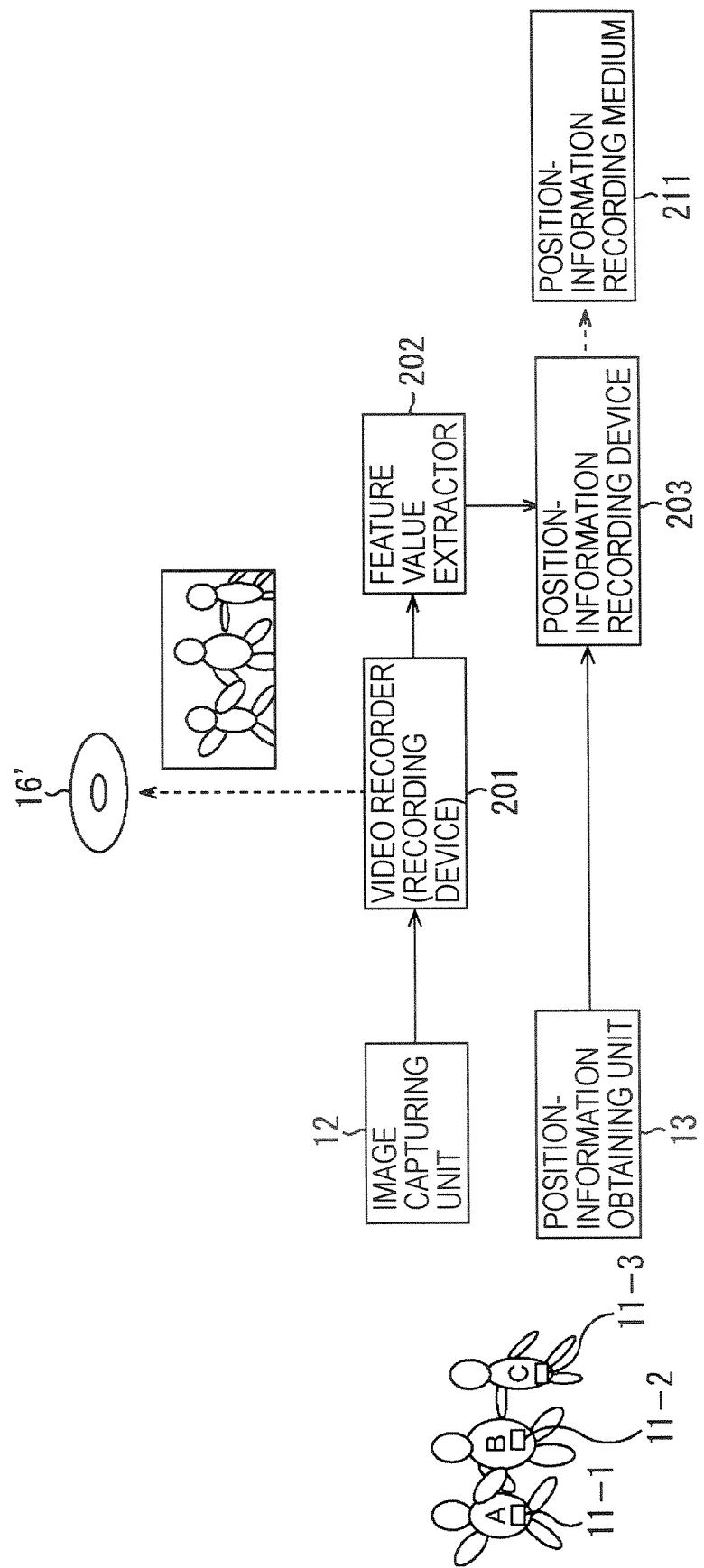
FIG. 21 is a diagram showing the structure of an image recording apparatus according to another embodiment of the present invention.

FIG. 21 shows an example structure of an image recording apparatus configured to record only an image captured by the image capturing unit 12 in a common medium and to record position information in a position-information recording medium different from the common medium. In FIG. 21, the same elements as those shown in FIG. 3 are represented by the same reference numerals, and a description thereof is omitted.

In the image recording apparatus shown in FIG. 21, sensors 11-1 to 11-3 and an image capturing unit 12 are similar to the corresponding elements of the image recording apparatus shown in FIG. 3. The image recording apparatus shown in FIG. 21 is different from the image recording apparatus shown in FIG. 3 in that a video recorder 201, a feature value extractor 202, and a position-information recording device 203 are provided in place of the combiner 14 and the video recorder 15.

The video recorder 201 records the image data supplied from the image capturing unit 12 in a common medium 16'. In the image recording apparatus shown in FIG. 21, therefore, the common medium 16' having only image data recorded therein is generated. The video recorder 201 supplies the image supplied from the image capturing unit 12 to the feature value extractor 202 without changing the image.

The feature value extractor 202 basically has a similar function to the feature value extractor 61 shown in FIG. 7, and is configured to extract feature values of the image frame-by-frame on the basis of the image data supplied from the image capturing unit 12 via the video recorder 201 and to supply the feature values to the position-information recording device 203.

The position-information recording device 203 records the position information supplied from the position-information obtaining unit 13 in the position-information recording medium 211 in association with the feature values supplied from the feature value extractor 202.

Figure 22:
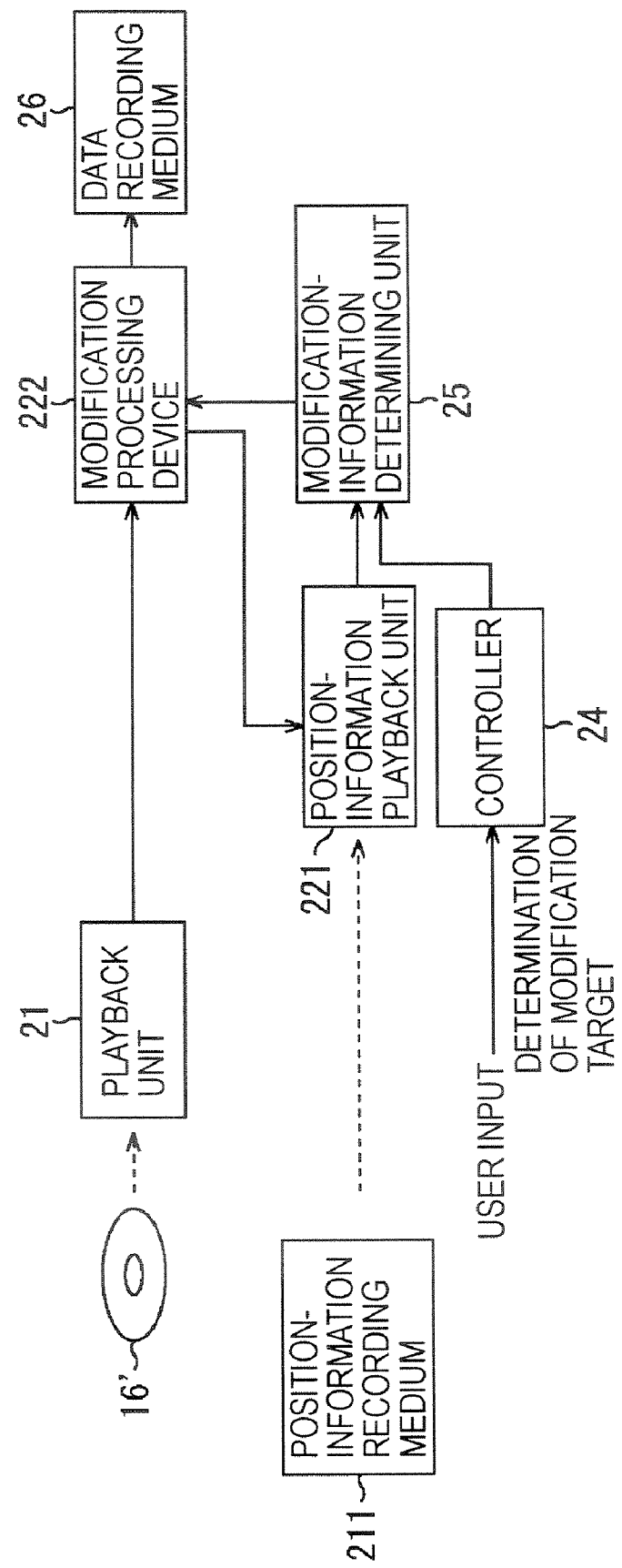
FIG. 22 is a diagram showing the structure of an image processing apparatus according to another embodiment of the present invention.

An example structure of an image processing apparatus configured to record only the image captured by the image capturing unit 12 in the common medium 16' and to record position information in the position-information recording medium 211 different from the common medium 16' will be described with reference to FIG. 22. In FIG. 22, the same elements as those shown in FIG. 4 are represented by the same reference numerals, and a description thereof is omitted.

Figure 23:
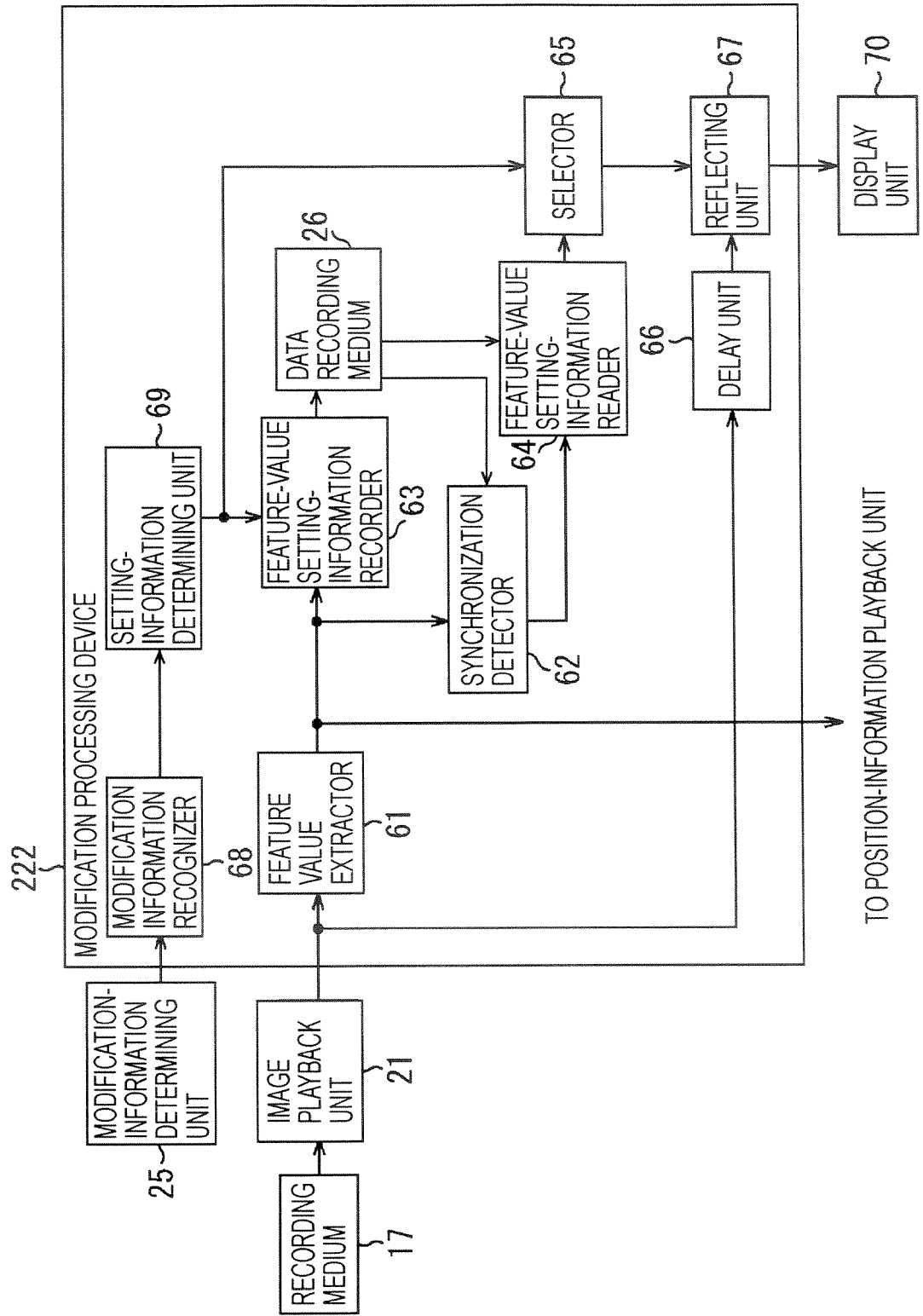
FIG. 23 is a diagram showing an example structure of a modification processing device in the image processing apparatus shown in FIG. 22.

In the image processing apparatus shown in FIG. 22, a playback unit 21, a controller 24, and a modification-information determining unit 25 are similar to the corresponding elements of the image processing apparatus shown in FIG. 4. The image processing apparatus shown in FIG. 23 is different from the image processing apparatus shown in FIG. 4 in that a position-information playback unit 211 and a modification processing device 222 are provided in place of the separator 22.

The position-information playback unit 221 reads the position information recorded in the position-information recording medium 211 in association with the feature value of the image supplied from the playback unit 21 via the modification information processing device 222.

An example structure of the modification processing device 222 will be described with reference to FIG. 23. The same elements as those of the modification processing device 23 shown in FIG. 7 are represented by the same reference numerals, and a description thereof is omitted. The modification processing device 222 shown in FIG. 23 is similar to the modification processing device 23 shown in FIG. 7, except that the feature value extractor 61 supplies a feature value to the position-information playback unit 221 in addition to the synchronization detector 62 and the feature-value setting-information recorder 63.

Figure 24:
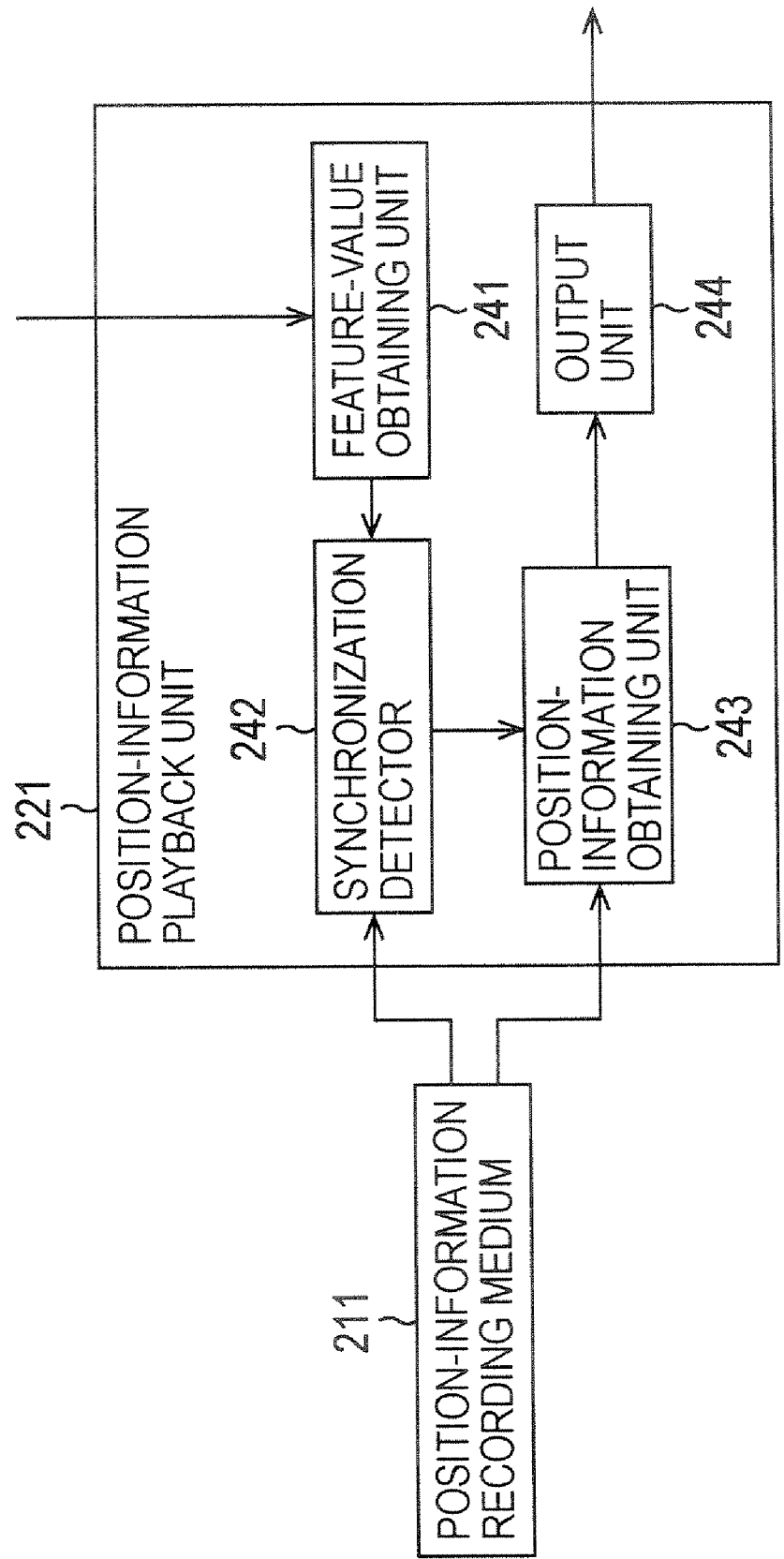
FIG. 24 is a diagram showing an example structure of a position-information playback unit in the image processing apparatus shown in FIG. 22.

An example structure of the position-information playback unit 221 will be described with reference to FIG. 24.

A feature-value obtaining unit 241 obtains the feature value supplied from the feature value extractor 61 of the modification processing device 222, and supplies it to a synchronization detector 242. The synchronization detector 242 is basically the same as the synchronization detector 62 shown in FIG. 7. That is, the synchronization detector 242 searches the feature values stored in the position-information recording medium 211 (search-position feature values) to find a feature value of the currently played back image that is supplied from the feature-value obtaining unit 241 (playback-position feature value). When the same feature value is detected, the synchronization detector 242 supplies the detection result to a position-information obtaining unit 243 as an image synchronization position.

Upon obtaining the feature value (search-position feature value) detected as the synchronization position by the synchronization detector 242, the position-information obtaining unit 243 obtains the position information stored in association with the feature value in the position-information recording medium 211, and supplies the obtained position information to an output unit 244. The output unit 244 supplies the position information supplied from the position-information obtaining unit 243 to the modification-information determining unit 25.

Figure 25:
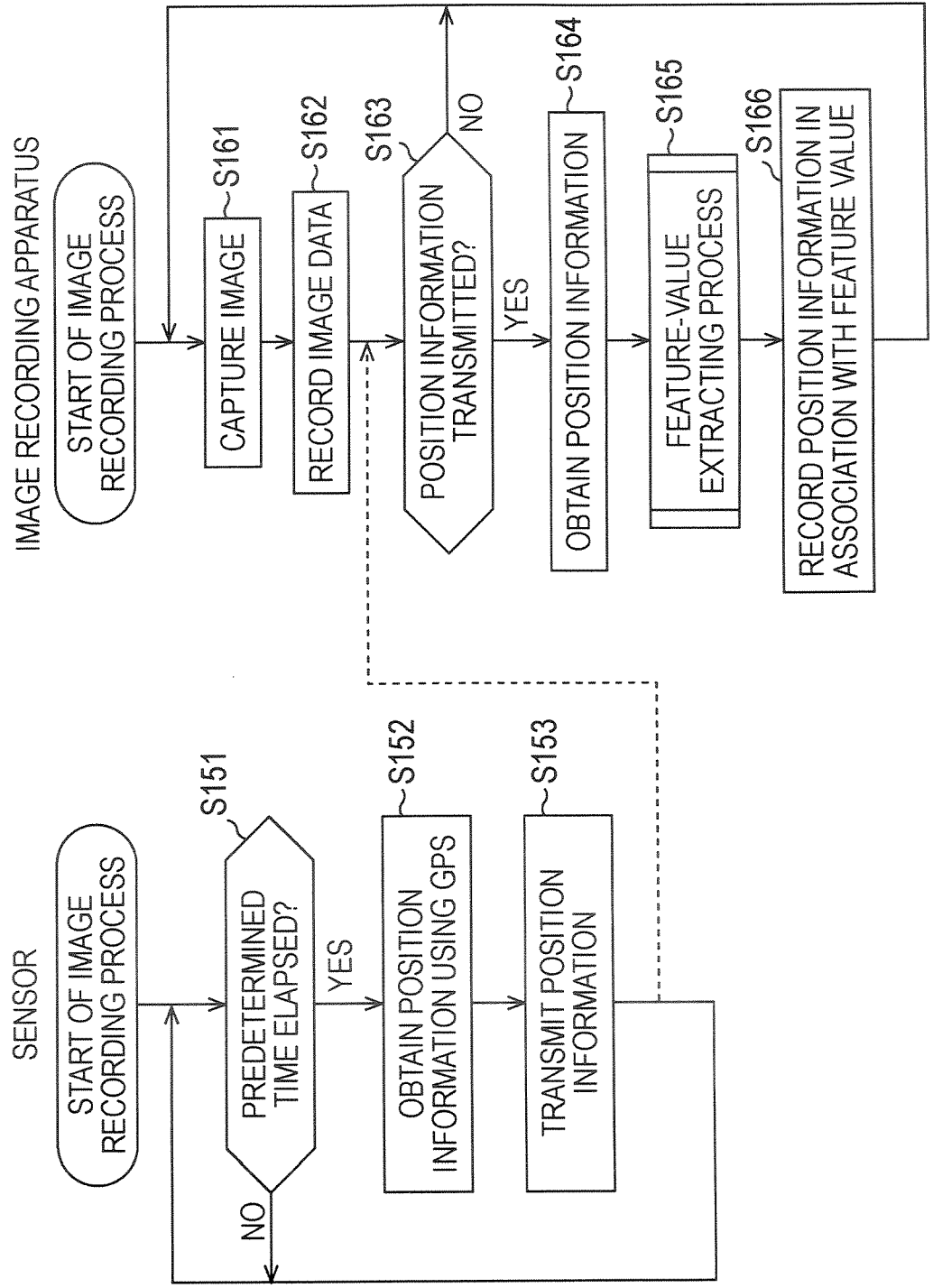
FIG. 25 is a flowchart showing an image recording process performed by the image recording apparatus shown in FIG. 21.

An image recording process performed by the image recording apparatus shown in FIG. 21 will be described with reference to a flowchart shown in FIG. 25. In the flowchart of FIG. 25, the processing of steps S151 to S153 is similar to the processing of steps S1 to S3 described with reference to the flowchart of FIG. 11, and a description thereof is thus omitted.

In step S161, the image capturing unit 12 of the image recording apparatus captures a desired image, generates image data from the captured image, and supplies the image data to the video recorder 201.

In step S162, the video recorder 201 records the image data supplied from the image capturing unit 12 in the common medium 16', and supplies the image to the feature value extractor 202.

In step S163, the position-information obtaining unit 13 determines whether or not position information has been transmitted from the sensor 11. If position information has not been transmitted, the process returns to step S161. For example, if it is determined that position information has been transmitted from the sensor 11 according to the processing of step S153, in step S164, the position-information obtaining unit 13 obtains the position information including the ID 32a unique to the sensor 11 transmitted from the sensor 11, and supplies the obtained position information to the position-information recording device 203.

In step S164, the position-information recording device 203 obtains the position information supplied from the position-information obtaining unit 13.

In step S165, the feature value extractor 202 performs a feature-value extracting process to extract a feature value of the image on the basis of the image data supplied from the image capturing unit 12 via the video recorder 201, and supplies the extracted feature value to the position-information recording device 203. The feature-value extracting process is similar to the process described above with reference to the flowchart of FIG. 16, and a description thereof is thus omitted.

In step S166, the position-information recording device 203 records in the position-information recording medium 211 the feature value supplied from the feature value extractor 202, and also records the position information supplied from the position-information obtaining unit 13 in association with the feature value. Then, the process returns to step S161.

With the process described above, when an image is captured, only the image is recorded in the common medium 16', and position information is recorded in the position-information recording medium 211 in association with a feature value of the image at that time. As a result, the common medium 16' has only the image recorded therein, and can therefore be played back by a commercially available playback apparatus. Since the position information is recorded in the position-information recording medium 211 in association with the feature value of the image, when the image recorded in the common medium 16' is played back according to a playback process described below, the position information can be reflected in the playback process by the image processing apparatus shown in FIG. 22 in synchronization with the image being played back.

An image modification process performed by the image processing apparatus shown in FIG. 22 will be described with reference to a flowchart shown in FIG. 26.

In step S191, the feature value extractor 61 of the modification processing device 222 determines whether or not a next image has been supplied from the playback unit 21, and repeats the determination until an image is supplied. For example, when the common medium 16' generated according to the above-described image recording process is played back by the playback unit 21 and image data is supplied, in step S192, the feature value extractor 61 performs a feature-value extracting process, and supplies the extracted feature value to the synchronization detector 62, the feature-value setting-information recorder 63, and the position-information playback unit 221. The feature-value extracting process is similar to the process described above with reference to the flowchart of FIG. 16, and a description thereof is thus omitted.

In step S193, the position-information playback unit 221 performs a position-information extracting process to extract position information from the position-information recording medium 211 in synchronization with the feature value, and supplies the position information to the modification-information determining unit 25.

Figure 27:
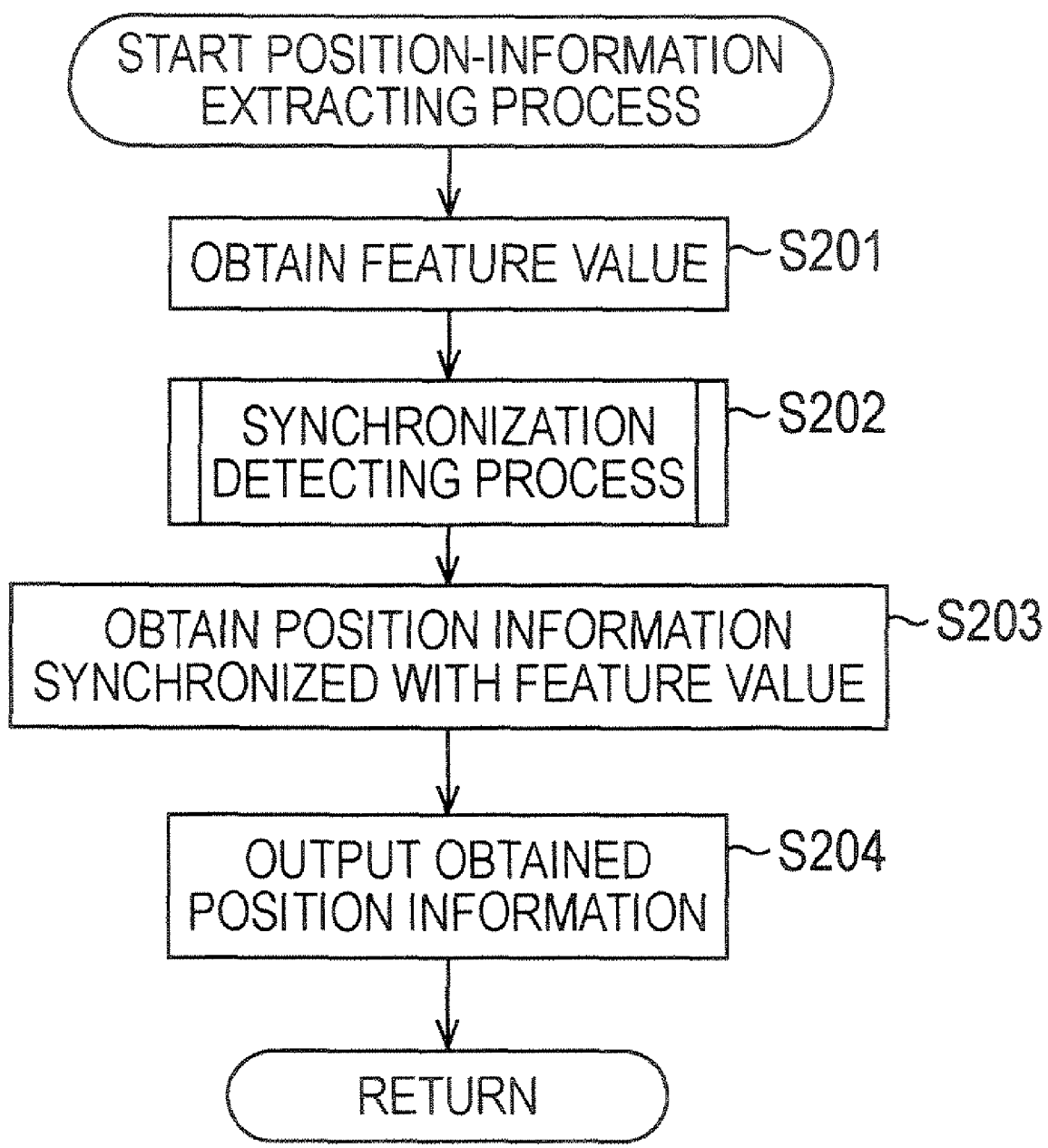
FIG. 27 is a flowchart showing a position-information extracting process in the image modification process shown in FIG. 26.

The position-information extracting process performed by the position-information obtaining unit 221 will be described with reference to a flowchart shown in FIG. 27.

In step S201, the feature-value obtaining unit 241 obtains the feature value of the image being currently played back by the common medium 16', which is supplied from the feature value extractor 61 of the modification processing device 222.

In step S202, the synchronization detector 242 performs a synchronization detecting process on the basis of the feature value supplied from the feature-value obtaining unit 241 to detect synchronization between the feature value of the image being currently played back and the feature value associated with the position information recorded in the position-information recording medium 211, and supplies a detection result to the position-information obtaining unit 243. The synchronization detecting process is similar to the process described above with reference to the flowchart of FIG. 19, and a description thereof is thus omitted.

In step S203, the position-information obtaining unit 243 obtains the position information recorded in association with the feature value supplied as the synchronization detection result from among the position information recorded in association with the feature values in the position-information recording medium 211, and supplies the obtained position information to the output unit 244.

In step S204, the output unit 244 supplies the position information supplied from the position-information obtaining unit 243 to the modification-information determining unit 25.

With the process described above, the position information recorded in association with the feature value of the image being played back is read in synchronization with the feature value from the position-information recording medium 211, and is supplied to the modification-information determining unit 25.

Figure 26:
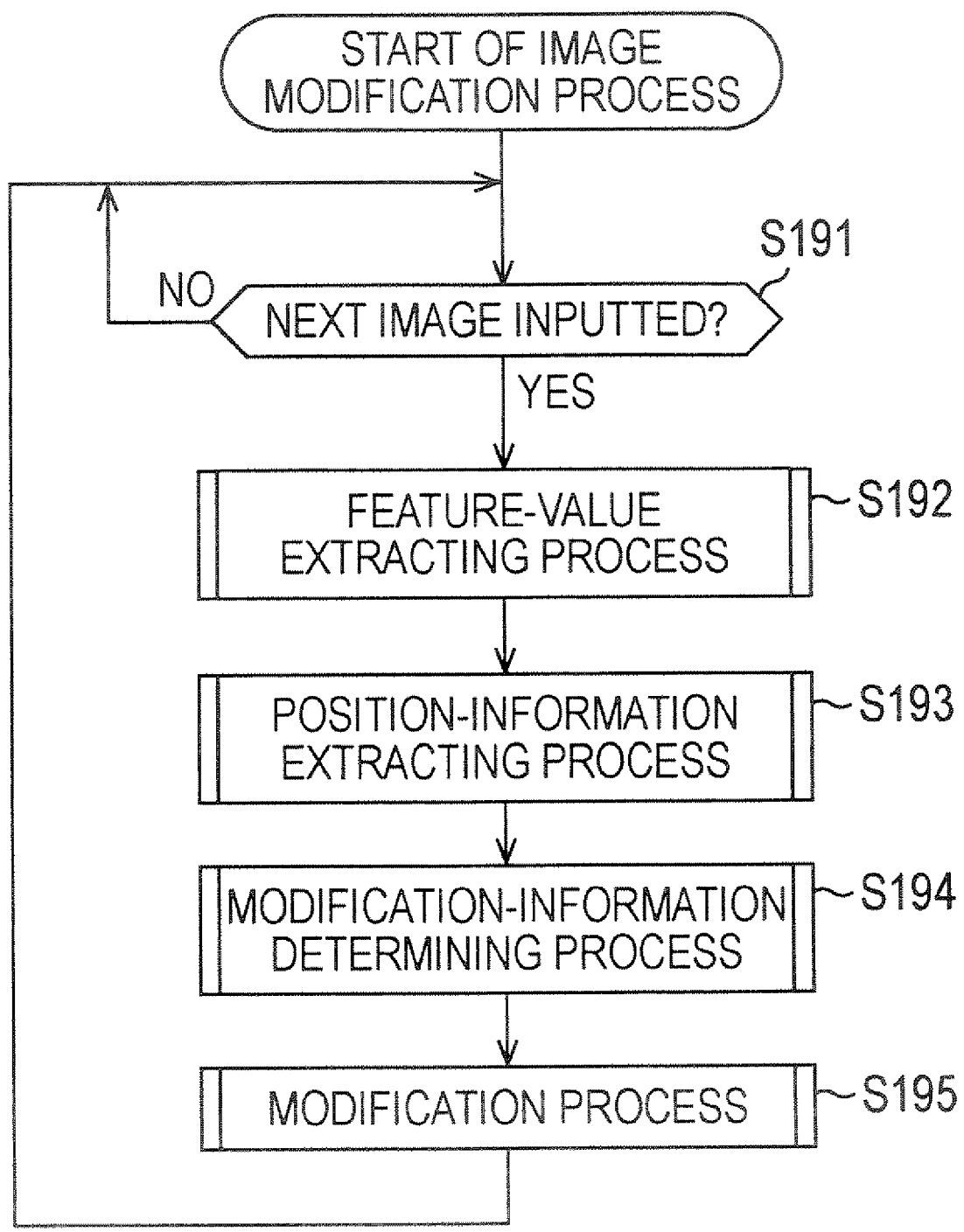
FIG. 26 is a flowchart showing an image modification process performed by the image processing apparatus shown in FIG. 22.

The description returns to the flowchart of FIG. 26.

In step S194, the modification-information determining unit 25 performs a modification-information determining process to generate modification information, and supplies the modification information to the modification processing device 222. The modification-information determining process is similar to the process described above with reference to the flowchart of FIG. 13, and a description thereof is thus omitted.

In step S195, the modification processing device 222 performs a modification process on the basis of the modification information supplied from the modification-information determining unit 25, and records setting information necessary for modifying the image in the data recording medium 26 in association with the feature value. Then, the process returns to step S191.

Figure 28:
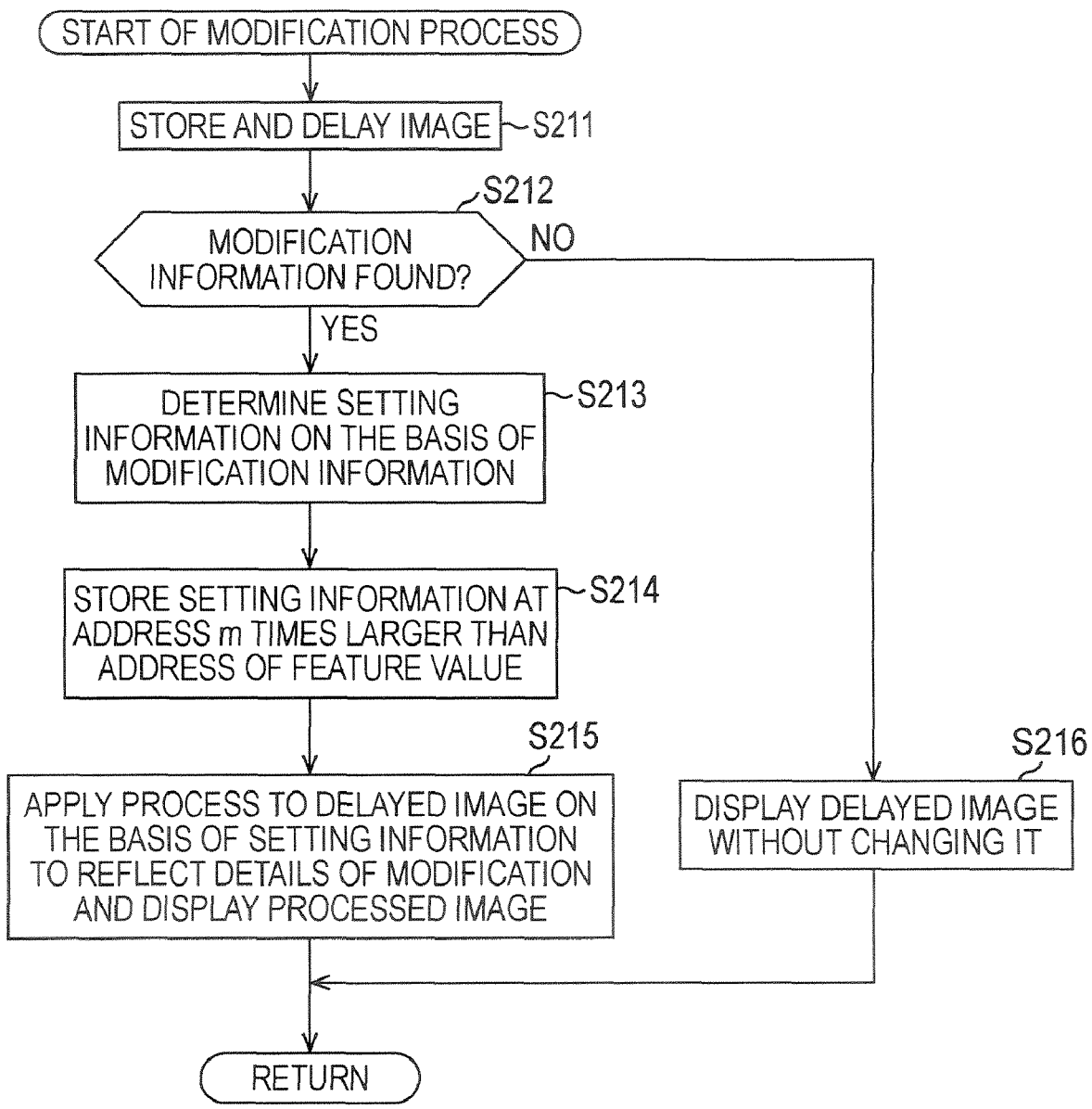
FIG. 28 is a flowchart showing a modification process in the image modification process shown in FIG. 26.

The modification process performed by the modification processing device 222 will be described with reference to a flowchart shown in FIG. 28. The processing of steps S211 to S216 in flowchart of FIG. 28 is similar to the processing of steps S61 and S63 to S67 in the flowchart of FIG. 15. That is, the feature-value extracting process performed in step S62 has been already performed in step S192, and is thus removed. The other processing of the flowchart of FIG. 28 is similar to the flowchart of FIG. 15, and a description thereof is thus omitted.

With the process described above, based on the image data of the common medium 16' and the position information of the position-information recording medium 211, when a user serving as a target object is located in the image and is in front of any other objects, a modification process for positioning the user at the center is applied, and setting information necessary for the modification process is recorded in the data recording medium 26.

Figure 29:
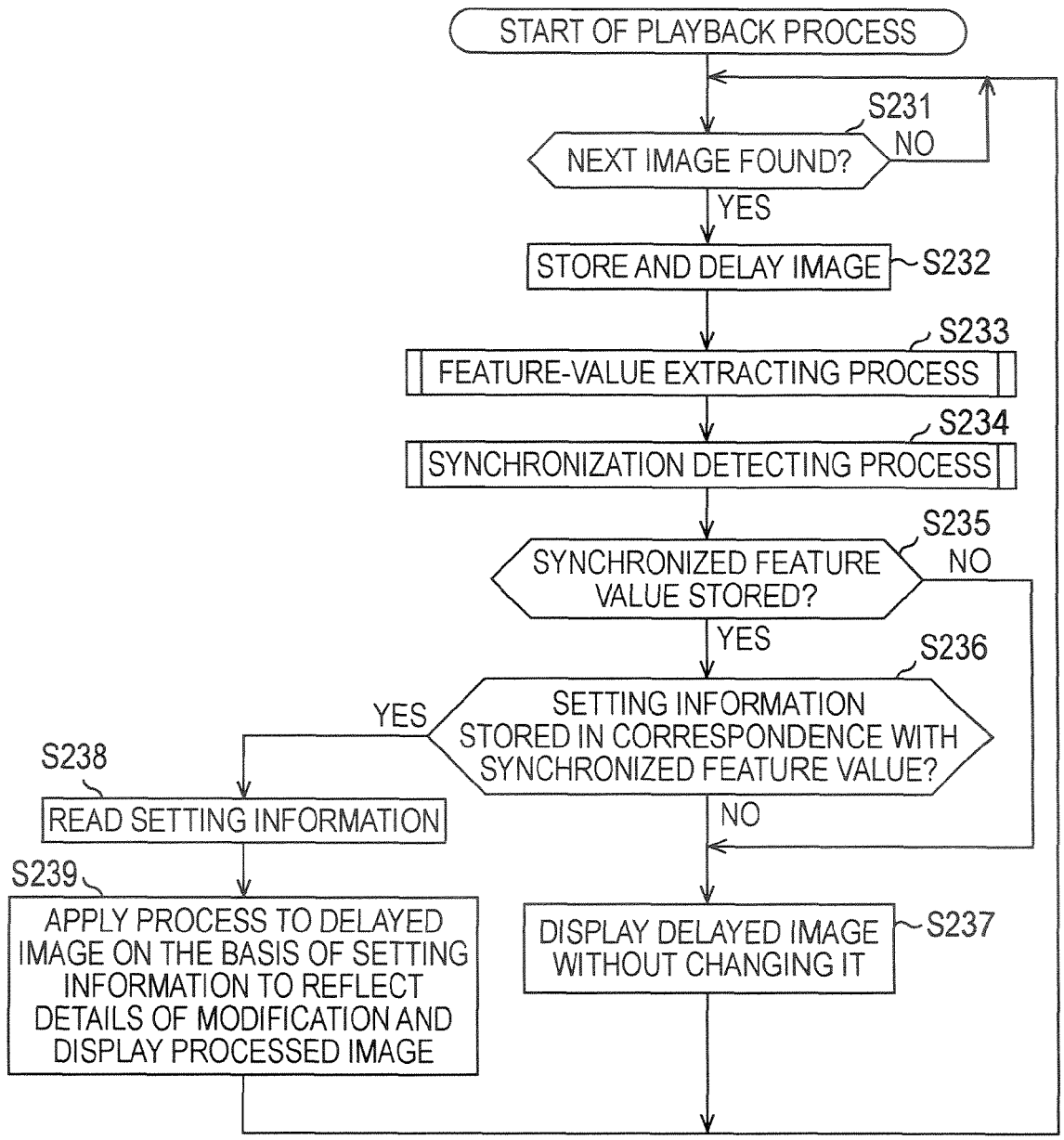
FIG. 29 is a flowchart showing a playback process performed by the image processing apparatus shown in FIG. 22.

A playback process performed by the image processing apparatus shown in FIG. 22 will be described with reference to a flowchart shown in FIG. 29. The processing of steps S231 to S239 in the flowchart of FIG. 29 is similar to the processing of steps S101 and S103 to S110 in the flowchart of FIG. 18. That is, the separation of the image data and the position information in step S102 is not necessary and is thus removed. The other processing of the flowchart of FIG. 29 is similar to the flowchart of FIG. 18, and a description thereof is thus omitted.

With the process described above, when an image is captured by the image capturing unit 12, if users serving as objects have the sensors 11, only the image data is recorded in the common medium 161, and the position information of each of the sensors 11 is recorded in the position-information recording medium 211 in association with a feature value of the image. Further, while the image is being played back on the basis of the image data recorded in the common medium 16' and the position information recorded in the position-information recording medium 211 in association with the feature values of the image, the above-described image modification process is performed to store setting information for modifying the image for each of the users having the sensors 11 in the data recording medium 26 in association with the feature value of the image. When the image data recorded in the common medium 16' is played back, the played back image can be played back as an image modified on the basis of the setting information recorded in the data recording medium 26 in association with the feature value of the image.

Thus, for example, when a zoom process for zooming into a modification-target user is performed as a modification process, each time an image recorded in the common medium 16' is played back, the image can be played back so as to constantly zoom into the user as long as the modification-target user is included in the image. The image can therefore be played back in a manner in which the image capturing unit 12 captures the image while following only the modification-target user.

Since a modification is not directly applied to an image recorded in the common medium 16', even if the image recorded in the common medium 16' is an image that is no longer allowed to be copied, such as a "copy once" image, the image can be played back as an image whose focus is the modification-target user. Also for the other users having the sensors 11, by changing the setting information recorded in the data recording medium 26, the image can be modified for the individual users, and the modified images can be repeatedly played back. Since the common medium 16' has only the image data recorded therein, even a commercially available playback apparatus can be used to play back an unmodified image captured by the image capturing unit 12.

Furthermore, before an image to be recorded in the common medium 16' is captured, only the sensors 11 can be distributed to a plurality of users in advance, and after the image has been captured, the data recording medium 26 in which setting information is recorded by an image modification process can be generated. A combination of three media, namely, the common medium 16' in which the image is recorded, the data recording medium 26 in which the setting information is recorded in association with a feature value of the image recorded in the common medium 16', and the position-information recording medium 211 in which the position information is recorded in association with the feature value of the image, can be sold for each modification-target user, thus increasing the possibility of driving the users to buy such a combination of media compared with the sale of media in which only an image captured by the single image capturing unit 12 is recorded, resulting in contribution to more vigorous economic activity.

In the foregoing description, position information is obtained using GPS, by way of example. Any other technique capable of specifying a position may be used. For example, each user may have an IC tag, and a sensor for detecting the IC tags may be installed under the ground to obtain position information of the users.

According to a first embodiment of the present invention, an image including an object is captured; position information of the object is obtained; the image and the position information of the object are recorded; it is determined whether or not a specific object is included in the image on the basis of the recorded image and position information of the object; when it is determined that the specific object is included in the image, details of a modification to be applied to the image are specified; setting information for modifying the image is set on the basis of the details of the modification; a feature value is extracted from the image; and the setting information is recorded in a setting-information recording medium in association with the extracted feature value of the image.

Therefore, a captured image and position information of objects can be recorded. When a specific object is located in the image, a predetermined process can be applied to the image each time the image is played back, and the processed image can be reproduced without applying the process to the original image data. Further, even image data that is not allowed to be copied can be subjected to the same process each time the image data is played back, and the processed image can be repeatedly played back. Furthermore, a captured image and position information of objects can be recorded. Based on the image and the position information of the objects, when a specific object is located in the image, setting information for processing an image corresponding to the specific object to an image can be recorded in association with a feature value of the image.

According to the second embodiment of the present invention, it is determined whether or not a specific object is included in an image on the basis of the image; when it is determined that the specific object is included in the image, details of a modification to be applied to the image are specified; setting information for modifying the image is set on the basis of the details of the modification; a feature value is extracted from the image; and the setting information is recorded in a setting-information recording medium in association with the feature value of the image.

Therefore, when a specific object is located in an image, a predetermined process can be applied to the image each time the image is played back, and the processed image can be reproduced without applying the process to the original image data. Further, even image data that is not allowed to be copied is can be subjected to the same process each time the image data is played back, and the processed image can be repeatedly played back. Furthermore, when a specific object is located in an image, setting information for processing an image corresponding to the specific object can be recorded in association with a feature value of the image.

According to the third embodiment of the present invention, an image including an object is captured; position information of the object is obtained; and the image and the position information of the objects are recorded.

Therefore, when an image is captured, position information of an object can be recorded in association with the image. Furthermore, when an image is captured, position information of an object can be recorded in synchronization with the image.

The series of processes described above can be implemented by hardware or software. When the series of processes is implemented by software, a program constituting the software is installed from a recording medium onto a computer included in special hardware or a device capable of executing various functions with various programs installed therein, such as a general-purpose personal computer.

Figure 30:
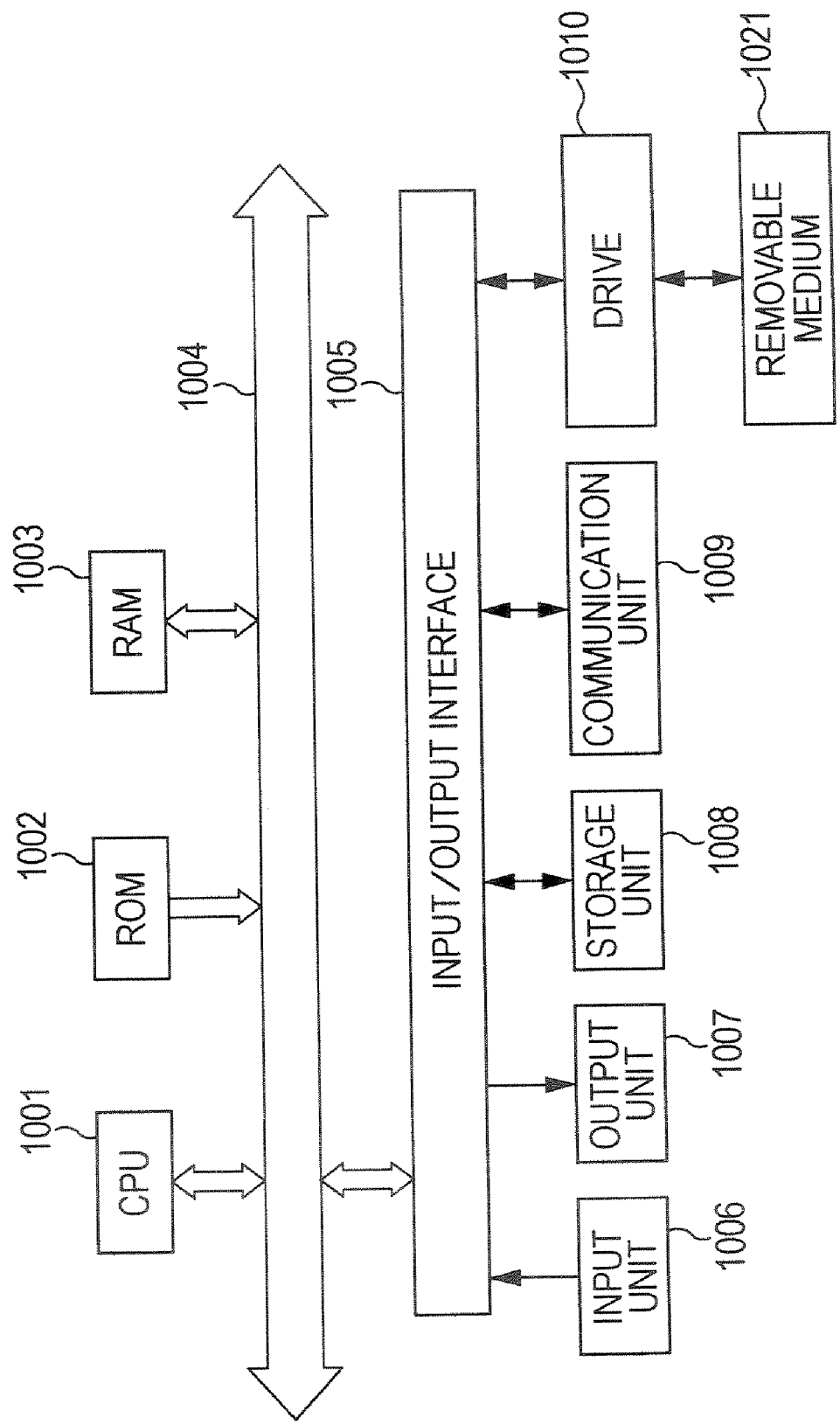
FIG. 30 is a diagram showing a medium.

FIG. 30 shows an example structure of a personal computer in a case where the internal electrical configuration of the image recording apparatus shown in FIG. 3 or 21 or the image processing apparatus shown in FIG. 4 or 22 is implemented by software. A central processing unit (CPU) 1001 of the personal computer controls the overall operation of the personal computer. The CPU 1001 executes a program stored in a read only memory (ROM) 1002 in response to an instruction given from a user to the CPU 1001 using an input unit 1006 including a keyboard and a mouse via a bus 1004 and an input/output interface 1005. The CPU 1001 loads into a random access memory (RAM) 1003 a program that is read from a removable medium 1021 connected to a drive 1010, such as a magnetic disk, an optical disk, a magneto-optical disk, or a semiconductor memory, and that is installed in a storage unit 1008, and executes the program. As a result, the functions of the image recording apparatus shown in FIG. 3 or 21 or the image processing apparatus shown in FIG. 4 or 22 are implemented by software. The CPU 1001 further controls a communication unit 1009 to communicate with the outside and to exchange data.

A recording medium having the program recorded therein may include packaged media having the program recorded therein, which are distributed separately from the computer in order to provide the program to a user, such as the removable medium 1021 shown in FIG. 30, including a magnetic disk (including a flexible disk), an optical disk (including a compact disc-read only memory (CD-ROM) and a digital versatile disc (DVD)), a magneto-optical disk (including a minidisc (MD)), or a semiconductor memory. Alternatively, such a recording medium may include a medium having the program recorded therein, which is provided to a user in the form included in the computer, such as the ROM 1002 or a hard disk included in the storage unit 1008.

In this specification, steps defining the programs recorded on the recording medium may include processes that are executed sequentially in the orders described herein, and may also include processes that are executed in parallel or individually, not necessarily sequentially.

In this specification, the term system refers to the entity of apparatuses composed of a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing system comprising:

an image capturing apparatus; and an image processing apparatus, the image capturing apparatus including image capturing means for capturing an image including an object, status-information obtaining means for obtaining status information of the object, and recording means for recording the image and the status information of the object, the image processing apparatus including modification-details determining means for specifying details of a modification to be applied to the image according to the image and the status information of the object recorded by the recording means, setting means for setting setting information for modifying the image on the basis of the details of the modification specified by the modification-details determining means, first feature-value extracting means for extracting a feature value from the image, and recording means for recording the setting information in a setting-information recording medium in association with the feature value of the image extracted by the first feature-value extracting means.

2. The image processing system according to claim 1, wherein the status information of the object includes position information of the object.

3. The image processing system according to claim 2, wherein:

the image processing apparatus further includes determining means for determining whether or not the image includes a specific object according to the image and the position information of the object recorded by the recording means; and when the determining means determines that the image includes the specific object, the modification-details determining means specifies details of a modification to be applied to the image.

4. The image processing system according to claim 2, wherein the status-information obtaining means obtains the position information of the object using a global positioning system.

5. The image processing system according to claim 2, wherein the status-information obtaining means obtains the position information of the object using an IC tag and a sensor.

6. The image processing system according to claim 1, wherein:

the image capturing apparatus further includes combining means for combining the status information of the object with the image;

the recording means records in an image recording medium the image with which the status information of the object is combined by the combining means;

the image processing apparatus further includes separating means for separating the image and the status information from the image with which the status information of the object is combined by the combining means; and the modification-details determining means specifies details of a modification to be applied to the image according to the image and status information separated by the separating means.

7. The image processing system according to claim 1, wherein:

the recording means includes image recording means for recording the image, second feature-value extracting means for extracting a feature value from the image, and status-information recording means for recording the status information of the object in association with the feature value extracted by the second feature-value extracting means, the image recording means being configured to record the image in an image recording medium, and the status-information recording means being configured to record the status information of the object in a status-information recording medium in association with the feature value extracted by the second feature-value extracting means; the image processing apparatus further includes synchronizing means for synchronizing the feature value recorded in the status-information recording medium with the feature value extracted by the first feature-value extracting means, and obtaining means for obtaining the status information associated with the feature value synchronized by the synchronizing means from the status-information recording medium; and the modification-details determining means specifies details of a modification to be applied to the image according to the image recorded on the image recording medium and the status information obtained by the obtaining means.

8. An image processing method for an image processing system including an image capturing apparatus and an image processing apparatus, the image processing method comprising the steps of:

by the image capturing apparatus, capturing an image including an object;

by the image capturing apparatus, obtaining status information of the object;

by the image capturing apparatus, recording the image and the status information of the object;

by the image processing apparatus, specifying details of a modification to be applied to the image according to the image and the status information of the object recorded by the image capturing apparatus;

by the image processing apparatus, setting setting information for modifying the image on the basis of the specified details of the modification;

by the image processing apparatus, extracting a feature value from the image; and by the image processing apparatus, recording the setting information in a setting-information recording medium in association with the extracted feature value.

9. A non-transitory computer-readable medium storing computer-readable instructions thereon that when executed by a an image processing system including an image capturing apparatus and an image processing apparatus cause the image processing system to perform a method, comprising:

capturing an image including an object, obtaining status information of the object, and recording the image and the status information of the object; and specifying details of a modification to be applied to the image according to the image and the status information of the object recorded by the image capturing apparatus, setting setting information for modifying the image on the basis of the specified details of the modification, extracting a feature value from the image, and recording the setting information in a setting-information recording medium in association with the extracted feature value.

10. An image processing apparatus comprising:

modification-details determining means for specifying details of a modification to be applied to an image according to a state of a specific object in the image;

setting means for setting setting information for modifying the image on the basis of the details of the modification specified by the modification-details determining means;

feature-value extracting means for extracting a feature value from the image; and recording means for recording the setting information in a setting-information recording medium in association with the feature value of the image extracted by the feature-value extracting means.

11. The image processing apparatus according to claim 10, wherein:
the image includes status information of each object in the image;
the state of the specific object in the image is based on the status information of each object in the image; and
the modification-details determining means specifies details of a modification to be applied to the image according to the state of the specific object based on the status information of each object in the image.

12. The image processing apparatus according to claim 11, wherein:
the status information includes position information;
the image processing apparatus further comprises determining means for determining whether or not the specific object is located in the image and is in front of any other objects in the image on the basis of the position information of each object in the image to determine whether or not the image includes the specific object; and
the modification-details determining means specifies details of a modification to be applied to the image on the basis of a determination result of the determining means.

13. The image processing apparatus according to claim 10, further comprising obtaining means for obtaining status information of each object in the image that is associated with the feature value of the image,
wherein the state of the specific object is based on the status information of each object in the image that is associated with the feature value of the image, and
the modification-details determining means specifies details of a modification to be applied to the image according to the state of the specific object based on the status information of each object in the image that is associated with the feature value of the image.

14. The image processing apparatus according to claim 13, wherein:
the status information includes position information;
the image processing apparatus further comprises determining means for determining whether or not the specific object is located in the image and is in front of any other objects in the image on the basis of the position information of each object in the image that is associated with the feature value of the image to determine whether or not the image includes the specific object; and
the modification-details determining means specifies details of a modification to be applied to the image on the basis of a determination result of the determining means.

15. An image processing method implemented by an image processing apparatus comprising the steps of:
specifying details of a modification to be applied to an image according to a state of a specific object in the image;
setting setting information for modifying the image on the basis of the specified details of the modification;
extracting a feature value from the image; and
recording the setting information in a setting-information recording medium in association with the extracted feature value of the image.

16. A non-transitory computer-readable medium storing computer-readable instructions thereon that when executed by an image processing apparatus cause the image processing system to perform a method comprising:
specifying details of a modification to be applied to an image according to a state of a specific object in the image;
setting setting information for modifying the image on the basis of the specified details of the modification;
extracting a feature value from the image; and
recording the setting information in a setting-information recording medium in association with the extracted feature value of the image.

17. An image capturing apparatus comprising:
image capturing means for capturing an image including an object;
status-information obtaining means for obtaining status information of the object; and
recording means for recording the image and the status information of the object,
wherein the image and the status information of the object enable specification of details of a modification to be applied to the image, details of the modification enable setting of setting information for modifying the image on the basis of the details, the setting information associated with a feature value extracted from the image.

18. The image capturing apparatus according to claim 17, wherein the status information includes position information.

19. The image capturing apparatus according to claim 18, wherein the status-information obtaining means obtains the position information of the object using a global positioning system.

20. The image capturing apparatus according to claim 18, wherein the status-information obtaining means obtains the position information of the object using an IC tag and a sensor.

21. The image capturing apparatus according to claim 17, further comprising combining means for combining the status information of the object with the image,
wherein the recording means records in an image recording medium the image with which the status information of the object is combined by the combining means.

22. The image capturing apparatus according to claim 17, wherein the recording means includes:
image recording means for recording the image;
feature-value extracting means for extracting a feature value from the image; and
status-information recording means for recording the status information of the object in association with the feature value extracted by the feature-value extracting means.

23. An image capturing method implemented by an image capturing apparatus comprising:
capturing an image including an object;
obtaining status information of the object; and
recording the image and the status information of the object,
wherein the image and the status information of the object enable specification of details of a modification to be applied to the image, details of the modification enable setting of setting information for modifying the image on the basis of the details, the setting information associated with a feature value extracted from the image.

24. A non-transitory computer-readable medium storing computer-readable instructions thereon that when executed by an image capturing apparatus cause the image processing system to perform a method comprising:
capturing an image including an object;
obtaining status information of the object; and
recording the image and the status information of the object,
wherein the image and the status information of the object enable specification of details of a modification to be applied to the image, details of the modification enable setting of setting information for modifying the image on the basis of the details, the setting information associated with a feature value extracted from the image.

25. An image processing system comprising:
an image capturing apparatus; and
an image processing apparatus,
the image capturing apparatus including
- an image capturing unit that captures an image including an object,
- a status-information obtaining unit that obtains status information of the object, and
- a recording unit that records the image and the status information of the object, the image processing apparatus including
- a modification-details determining unit that specifies details of a modification to be applied to the image according to the image and the status information of the object recorded by the recording unit,
- a setting unit that sets setting information for modifying the image on the basis of the details of the modification specified by the modification-details determining unit,
- a first feature-value extracting unit that extracts a feature value from the image, and
- a recording unit that records the setting information in a setting-information recording medium in association with the feature value of the image extracted by the first feature-value extracting unit.

26. An image processing apparatus comprising:
- a modification-details determining unit that specifies details of a modification to be applied to an image according to a state of a specific object in the image;
- a setting unit that sets setting information for modifying the image on the basis of the details of the modification specified by the modification-details determining unit;
- a feature-value extracting unit that extracts a feature value from the image; and
- a recording unit that records the setting information in a setting-information recording medium in association with the feature value of the image extracted by the feature-value extracting unit.

27. An image capturing apparatus comprising:
- an image capturing unit that captures an image including an object;
- a status-information obtaining unit that obtains status information of the object; and
- a recording unit that records the image and the status information of the object,
- wherein the image and the status information of the object enable specification of details of a modification to be applied to the image, details of the modification enable setting of setting information for modifying the image on the basis of the details, the setting information associated with a feature value extracted from the image.

* * * * *